United States Patent
Stoica et al.

(10) Patent No.: US 12,323,240 B2
(45) Date of Patent: *Jun. 3, 2025

(54) RADIO ACCESS NETWORK CONFIGURATION FOR VIDEO APPROXIMATE SEMANTIC COMMUNICATIONS

(71) Applicant: Lenovo (Singapore) Pte. Ltd., New Tech Park (SG)

(72) Inventors: Razvan-Andrei Stoica, Essen (DE); Hossein Bagheri, Urbana, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,781

(22) Filed: May 15, 2023

(65) Prior Publication Data
US 2023/0291497 A1 Sep. 14, 2023

Related U.S. Application Data

(63) Continuation of application No. 17/555,237, filed on Dec. 17, 2021, now Pat. No. 11,824,653.

(51) Int. Cl.
*H04L 1/18* (2023.01)
*H04L 1/00* (2006.01)
*H04N 19/89* (2014.01)

(52) U.S. Cl.
CPC .......... *H04L 1/0056* (2013.01); *H04L 1/0041* (2013.01); *H04N 19/89* (2014.11)

(58) Field of Classification Search
None
See application file for complete search history.

(56) References Cited

U.S. PATENT DOCUMENTS 6,404,817 B1   6/2002   Saha et al.
6,754,278 B1   6/2004   Suh et al.
(Continued)

FOREIGN PATENT DOCUMENTS

EP   3041195 A1   1/2008
EP   2574010 A2   9/2012
(Continued)

OTHER PUBLICATIONS

3GPP, "CSI Feedback Enhancements for IIoT/URLLC", GPP TSG-RAN WG1 Meeting #104-e, Tdoc R1-2100269, Jan. 25-Feb. 5, 2021, pp. 1-12.
(Continued)

*Primary Examiner* — Mujtaba M Chaudry
(74) *Attorney, Agent, or Firm* — Kunzler Bean & Adamson

(57) ABSTRACT

An apparatuses for radio access network configuration for video approximate semantic communications includes a transceiver that receives from a transmitter a bitstream corresponding to a video coded data transmission wherein the received bitstream includes bitwise transmission errors and a processor that performs FEC decoding and correcting at least one bitwise transmission error of the video coded data transmission whereas at least one bitwise transmission error is left in a bit-inexact reception of the video coded data transmissions post FEC decoding, applies, by a smart video decoder in a video approximate semantic communications mode, semantic error correction to decoded video coded data transmissions to correct and conceal one or more video artifacts in response to the bit-inexact reception of the video coded data transmissions post FEC decoding, and reconstructs a video uncoded representation of concealed approximate semantic content relative to the received bitstream corresponding to the video coded data transmission.

18 Claims, 12 Drawing Sheets

(56) References Cited

U.S. PATENT DOCUMENTS

| | | | |
|---|---|---|---|
| 6,909,450 B2* | 6/2005 | Paulin | H04N 19/89 |
| | | | 375/E7.199 |
| 6,964,021 B2 | 11/2005 | Jun et al. | |
| 7,886,201 B2* | 2/2011 | Shi | H04L 1/0045 |
| | | | 714/52 |
| 7,974,341 B2 | 7/2011 | Chen et al. | |
| 7,987,415 B2 | 7/2011 | Niu et al. | |
| 8,599,316 B2 | 12/2013 | Deever | |
| 8,605,221 B2 | 12/2013 | Deever | |
| 8,621,320 B2 | 12/2013 | Yang et al. | |
| 8,654,834 B2 | 2/2014 | Cho et al. | |
| 8,989,559 B2 | 3/2015 | Chen et al. | |
| 9,386,326 B2* | 7/2016 | Noru | H04N 19/895 |
| 9,432,298 B1* | 8/2016 | Smith | H04L 49/9057 |
| 9,584,258 B2 | 2/2017 | Oh et al. | |
| 10,015,486 B2* | 7/2018 | Kumar | H04N 19/89 |
| 10,616,383 B2 | 4/2020 | Mobasher et al. | |
| 10,664,687 B2 | 5/2020 | Suri et al. | |
| 10,764,574 B2* | 9/2020 | Teo | H04N 19/103 |
| 11,562,565 B2* | 1/2023 | Cristache | G06V 20/13 |
| 11,917,206 B2 | 2/2024 | Stoica et al. | |
| 2002/0146074 A1* | 10/2002 | Ariel | H04L 1/0013 |
| | | | 375/240.2 |
| 2002/0157058 A1* | 10/2002 | Ariel | H03M 13/6362 |
| | | | 714/790 |
| 2009/0213938 A1* | 8/2009 | Lee | H04N 19/61 |
| | | | 375/E7.076 |
| 2019/0075308 A1 | 3/2019 | Wei et al. | |
| 2020/0106554 A1 | 4/2020 | Kannan et al. | |
| 2020/0195946 A1 | 6/2020 | Choi et al. | |
| 2020/0287654 A1 | 9/2020 | Xi et al. | |
| 2020/0351936 A1 | 11/2020 | Kunt et al. | |
| 2021/0028893 A1 | 1/2021 | Hwang et al. | |
| 2021/0099715 A1 | 4/2021 | Topiwala et al. | |
| 2021/0174155 A1 | 6/2021 | Smith et al. | |
| 2021/0320956 A1 | 10/2021 | Berliner et al. | |
| 2022/0413741 A1* | 12/2022 | Livis | G06F 3/0655 |
| 2024/0049308 A1 | 2/2024 | Xue et al. | |

FOREIGN PATENT DOCUMENTS

| | | |
|---|---|---|
| WO | 2008066257 A1 | 6/2008 |
| WO | 2020139921 A1 | 7/2020 |

OTHER PUBLICATIONS

3GPP, "CSI enhancement for IOT and URLLC", 3GPP TSG RAN WG1 #104-e, R1-2101460, Jan. 25-Feb. 5, 2021, pp. 1-18.

3Gpp, "3rd Generation Partnership Project; Technical Specification Group Services and System Aspects; Extended Reality (XR) in 5G (Release 16)", 3GPP TR 26.928 V16.0.0, Mar. 2020, pp. 1-131.

3GPP, "FS_XRTraffic: Permanent document, v0.8.0", 3GPP TSG-SA4 Meeting #115e, S4-211210, Aug. 18-27, 2021, pp. 1-130.

ITU-T, "SSeries H: Audiovisual and Multimedia Systems Infrastructure of audiovisual services—Coding of moving video Advanced video coding for generic audiovisual services", H.264, Aug. 2021, pp. 1-844.

ITU-T, "Series H: Audiovisual and Multimedia System Infrastructure of Audiovisual Services—Coding of Moving video. High Efficiency Video Coding", H.265, Aug. 2021, pp. 1-716.

ITU-T, "Series H: Audiovisual and Multimedia Systems: Infrastructure of Audiovisual Services—Coding of Moving video. Versatile Video Coding", H.266, Aug. 2020, 1-516.

Peter de Rivaz, et. al., "AV1 Bitstream & Decoding Process Specification", The Alliance for Open Media, 2018, Version 1.0.0, Jan. 8, 2019, pp. 1-681.

F. Zhang, et al., "Intelligent image and video compression: communicating pictures", Academic Press; 2nd edition, Apr. 7, 2021, pp. 1-610.

A. Shahriari, W. A. C. Fernando and H. K. Arachchi, "Adaptive Error Concealment With Radial Basis Neuro-Fuzzy Networks For Video Communication over Lossy Channels," First International Conference on Industrial and Information Systems, 2006, pp. 600-604, doi: 10.1109/ICIIS.2006.365799.

Arun Sankisa, et al., "Video error concealment using deep neural networks", 2018 25th IEEE International Conference on Image Processing (ICIP), Oct. 2018, pp. 380-384.

C. Gao, "Flow-edge Guided Video Completion", European Conference on Computer Vision, Aug. 2020, pp. 713-729.

D. Ulyanov, et. al., "Deep Image Prior", Proceedings of the IEEE Conference on Computer Vision and Pattern Recognition, 2018, pp. 9446-9454.

3GPP, "3rd Generation Partnership Project; Technical Specification Group Services and System Aspects; System architecture for the 5G System (5GS); Stage 2 (Release 17)", 3GPP TS 23.501 V17.2.0, Sep. 2021, pp. 1-542.

C. E. Shannon, "A Mathematical Theory of Communication" The Bell system technical journal, 27(3), 1948, pp. 379-423.

E. C. Strinati, et al., "6G Networks: Beyond Shannon Towards Semantic and Goal-Oriented Communications", Computer Networks, 2021, pp. 1-52.

3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

3GPP, "Further Potential XR Enhancements", 3GPP TSG RAN WG1 Meeting #106bis-e, R1-2109556, Oct. 11-19, 2021, pp. 1-7.

Ashfaq et al., "Hybrid Automatic repeat Request (HARQ) in Wireless Communications Systems and Standards: A Contemporary Survey", IEEE Communications Surveys & Tutorials, vol. 23, No. 4, Jul. 2, 1021, pp. 1-42.

Rahmani et al., "Compressed domain visual information retrieval based on I-frames in HEVC", Springer Science +Business Media, Mar. 4, 2016, pp. 1-18.

Ducla-Soares et al., "Error resilience and concealment performance for MPEG-4 frame-based video coding", Signal Processing. Image Communication, Elsevier Science Publishers, May 1, 1999, pp. 1-26.

Moderator of XR Enhancements (Nokia), "Moderator's Summary on [RAN94e-R18Prep-11] Enhancements for XR", 3GPP TSG RAN#94e RP-212671, Dec. 6-17, 2021, pp. 1-54.

Nokia, "New SID on XR Enhancements for NR", 3GPP TSG RAN Meeting #94e RP-212711, Dec. 6-17, 2021, pp. 1-5.

3GPP, Digital cellular telecommunications system (Phase 2+) (GSM); Universal Mobile Telecommunications System (UMTS); LTE; 5G; Transparent end-to-end packet switched streaming service (PSS); 3GPP file format (3GP) (3GPP TS 26.244 version 16.1.0 Release 16), ETSI TS 126 244, Oct. 2020, pp. 1-71.

3GPP, "5G; NR; Multiplexing and channel coding (3GPP TS 38.212 version 16.5.0 Release 16)", ETSI TS 138 212, Apr. 2021, pp. 1-155.

Zargari et al., "Visual Information Retrieval in HEVC Compressed Domain", 2015 23rd Iranina Conference on Electrical Engineering (ICEE), May 10-14, 2015, pp. 793-798.

Yip et al., "Joint source and channel coding for H.264 compliant stereoscopic video transmission", Electrical and Computer Engineering, IEEE, May 1, 2005, pp. 1-5.

Dung et al., "Unequal Error Protection for H.26L Video Transmission", Wireless Personal Multimedia Communications, IEEE, Oct. 27, 2002, pp. 1-6.

Naghdinezhad et al., "Frame distortion estimation for unequal error protection methods in scalable video coding (SVC)", Signal Processing, Elsevier Science Publishers, Jul. 30, 2014, pp. 1-16.

Perera et al., "QoE aware resource allocation for video communications over LTE based mobile networks", 10th International Conference on Heterogeneous Networking for Quality, Reliability, Security and Robustness, ICST, Aug. 18, 2014, pp. 1-8.

(56) References Cited

OTHER PUBLICATIONS

U.S. Appl. No. 18/396,580, "Office Action Summary", US Patent Office, Aug. 15, 2024, pp. 1-16.
U.S. Appl. No. 17/555,121. "Office Action Summary", US Patent Office, Aug. 16, 2024, pp. 1-43.
U.S. Appl. No. 17/555,121, "Office Action Summary", US Patent Office, Dec. 12, 2024, pp. 1-23.

\* cited by examiner

RADIO ACCESS NETWORK CONFIGURATION FOR VIDEO APPROXIMATE SEMANTIC COMMUNICATIONS

CROSS-REFERENCE TO RELATED APPLICATIONS

This application is a continuation application of U.S. patent application Ser. No. 17/555,237 filed on Dec. 17, 2021, which is incorporated herein by reference in its entirety.

FIELD

The subject matter disclosed herein relates generally to wireless communications and more particularly relates to radio access network configuration for video approximate semantic communications.

BACKGROUND

In wireless networks, emerging applications such as augmented reality ("AR")/virtual reality ("VR")/extended reality ("XR"), cloud gaming ("CGM"), device remote tele-operation (e.g., vehicle tele-operation, robot arms tele-operation, or the like), 3D video conferencing, smart remote education, or the like are expected to drive increase in video traffic. Even though the foregoing applications may require different quantitative constraints and configurations in terms of rate, reliability, latency, and quality of service ("QoS"), it is expected that such constraint sets will challenge current and future communications networks in delivering a high-fidelity quality of experience ("QoE") at ever increasing resolutions. As the quality of rendering end devices will increase and their costs will decrease with time, such applications are expected to steadily expand and furthermore also increase the bar on the QoE of end applications. As such it is of high interest to provide scalable and reliable solutions from a communications network perspective for the next generation media content delivery systems and their immersive digital reality applications.

BRIEF SUMMARY

Disclosed are procedures for radio access network configuration for video approximate semantic communications. Said procedures may be implemented by apparatus, systems, methods, and/or computer program products.

In one embodiment, a first apparatus includes a transceiver that receives from a transmitter a bitstream corresponding to a video coded data transmission wherein the received bitstream includes bitwise transmission errors. In one embodiment, the first apparatus includes a processor that performs forward error correction ("FEC") decoding and correcting at least one bitwise transmission error of the video coded data transmission whereas at least one bitwise transmission error is left in a bit-inexact reception of the video coded data transmissions post FEC decoding. In one embodiment, the processor applies, by a smart video decoder in a video approximate semantic communications mode, semantic error correction to decoded video coded data transmissions to correct and conceal one or more video artifacts in response to the bit-inexact reception of the video coded data transmissions post FEC decoding. In one embodiment, the processor reconstructs a video uncoded representation of concealed approximate semantic content relative to the received bitstream corresponding to the video coded data transmission.

In one embodiment, a first method includes receiving a bitstream corresponding to a video coded data transmission wherein the received bitstream from a transmitter includes bitwise transmission errors. In one embodiment, the first method includes performing FEC decoding and correcting at least one bitwise transmission error of the video coded data transmission whereas at least one bitwise transmission error is left in a bit-inexact reception of the video coded data transmissions post FEC decoding. In one embodiment, the first method includes applying, by a smart video decoder in a video approximate semantic communications mode, semantic error correction to decoded video coded data transmissions to correct and conceal one or more video artifacts in response to the bit-inexact reception of the video coded data transmissions post FEC decoding. In one embodiment, the first method includes reconstructing a video uncoded representation of concealed approximate semantic content relative to the received bitstream corresponding to the video coded data transmission.

In one embodiment, a second apparatus includes a transceiver that receives an indication of video approximate semantic communications mode of a receiver and a configuration thereof and transmits a plurality of video coded data transmissions. In one embodiment, the second apparatus includes a processor that uses the configuration of video approximate semantic communications mode of the receiver to process hybrid automatic repeat request ("HARQ") feedback monitoring and to signal for enablement/disablement of semantic error correction at the receiver.

In one embodiment, a second method includes receiving an indication of video approximate semantic communications mode of a receiver and a configuration thereof and transmitting a plurality of video coded data transmissions. In one embodiment, the second method includes using the configuration of video approximate semantic communications mode of the receiver to process HARQ feedback monitoring and to signal for enablement/disablement of semantic error correction at the receiver.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
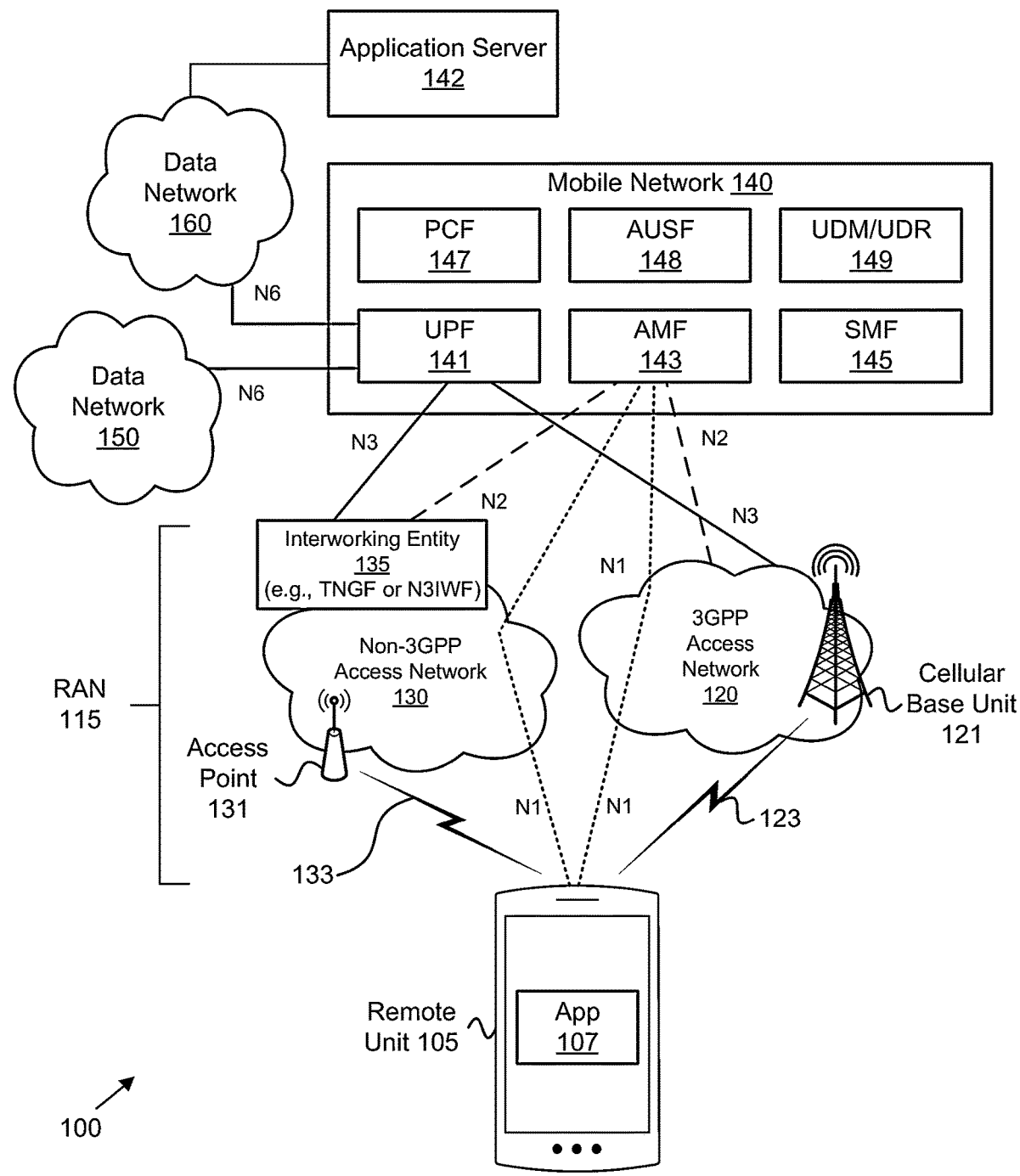
FIG. 1 is a schematic block diagram illustrating one embodiment of a wireless communication system for radio access network configuration for video approximate semantic communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for radio access network configuration for video approximate semantic communications. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Emerging applications such as augmented reality ("AR")/virtual reality ("VR")/extended reality ("XR"), cloud gaming ("CGM"), device remote tele-operation (e.g., vehicle tele-operation, robot arms tele-operation etc.), 3D video conferencing, smart remote education, or the like are expected to drive increase in video traffic. Even though the foregoing applications may require different quantitative constraints and configurations in terms of rate, reliability, latency, and quality of service ("QoS"), it is expected that such constraint sets will challenge current and future communications networks in delivering a high-fidelity quality of experience ("QoE") at ever increasing resolutions. As the quality of rendering end devices will increase and their costs will decrease with time, such applications are expected to steadily expand and furthermore also increase the bar on the QoE of end applications. As such it is of high interest to provide scalable and reliable solutions from a communications network perspective for the next generation media content delivery systems and their immersive digital reality applications.

Communications networks are one critical component of such applications. Another key technology in scaling the deployment of these immersive media experiences is the video encoding and compression of the source video information. This is critical in reducing the size of raw picture data to a point where communications systems can reliably transmit the video content over various challenging network conditions associated with mobile and wireless data systems and applications. Currently, the communications plane is completely separated from the video source encoding plane which makes the optimization of transmission strategies for reliable QoE of such video intensive applications difficult and/or limited. Despite current advances in video codec development (e.g., H.266 standard release), the data increase rates of high resolution multiview/AR/XR/3D applications exceed the compression gains. As such, it is of interest to develop novel mechanisms to aid the communications and access networks to understand video codec knowledge bases and exploit the latter in designing and configuring optimized transmission strategies for the mentioned video applications.

In one embodiment, this disclosure proposes a method for video approximate semantic communications that includes a processing model wherein a video codec specification represents a common fixed knowledge base at a transmitter and at a receiver that allows bit inexact communications at the Physical Layer ("PHY") transport level in opposition to conventional systems requiring bit exact transmissions, a smart video decoder as a semantic decoder composed of two joint functionalities encompassing the conventional video decoding and error concealment as a first operation and a second semantic error correction given by artificial intelligence ("AI")/machine learning ("ML") learned statistical models or non-learned machine vision statistical methods for approximate semantic reconstruction of bit inexact video coded transmitted data, an end-to-end ("E2E") communications pipeline integrating said semantic processing to allow for bit inexact video coded transmissions wherein PHY transport errors are mitigated and concealed at a semantic level, and associated radio access network ("RAN") level signaling to support video approximate semantic communications including user equipment ("UE")/smart video decoder capabilities, hybrid automatic repeat request ("HARQ") feedback mechanism, RAN configuration and control signaling.

FIG. 1 depicts a wireless communication system 100 for radio access network configuration for video approximate semantic communications, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing New Radio ("NR") Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. In one embodiment, the remote unites 105 include devices for presenting virtual reality environments, augmented reality environments, and/or extended reality environments, e.g., head-mounted display units.

Moreover, the remote units 105 may be referred to as User Equipment ("UE") devices, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (e.g., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally— or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides E2E user plane ("UP") connectivity between the remote unit 105 and a specific Data Network ("DN") through the UPF 141. A PDU Session supports one or more QoS Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, e.g., a tunnel between the remote unit 105 and a Packet Gateway ("P-GW"), not shown, in an Evolved Packet Core Network ("EPC"). In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with a first mobile core network, an EPC (not shown), to establish a second data connection (e.g., part of a second PDU session) with a second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a device, or by any other terminology used in the art. The cellular base units 121 are generally part of a RAN, such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (e.g., shared) radio spectrum.

The non-3GPP access networks 130 may be distributed over a geographic region. Each non-3GPP access network 130 may serve a number of remote units 105 within a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or an EPC, which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (e.g., session establishment, modification, release), remote unit (e.g., UE) Internet Protocol ("IP") address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more Application Programming Interfaces ("APIs")), a Network Repository Function ("NRF") (which provides NF service registration and discovery, enabling NFs to identify appropriate services in one another and communicate with each other over APIs), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

In one embodiment, the network 100 includes an application server 142 that hosts applications for use by the mobile network 140, the RAN 115, the remote unit 105, and/or the like. As it relates to the subject matter disclosed herein, the application server 142 may host a video codec-aware application that is used to determine and indicate an importance of an underlying NAL unit of video coded elementary stream. The importance indicator may also be placed within the mobile network 140 (e.g., at the UPF 141), the RAN 115 (e.g., at the upper layers), and/or the like.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, a common setup adopted at the 3GPP level, e.g., 3GPP Technical Report TR 26.928 (v16.0.0—November 2020). 5G; Extended Reality (XR) in 5G; S4-211210: [FS_XRTraffic]: Permanent document, v0.8.0, Rapporteur Qualcomm Inc., (2021), for immersive XR and high-performance video content transmissions relies on the concept of split rendering. This uses an application server located at the edge and connected to a core network ("CN"), which is used to encode the application video content and transfer it to a RAN for mobile communications. In exchange, the RAN communicates with a connected UE, which may use additional hardware/software processing to render the video content to match a user's pose/inputs/control state. This architectural approach is displayed for reference in FIG. 2.

Figure 2:
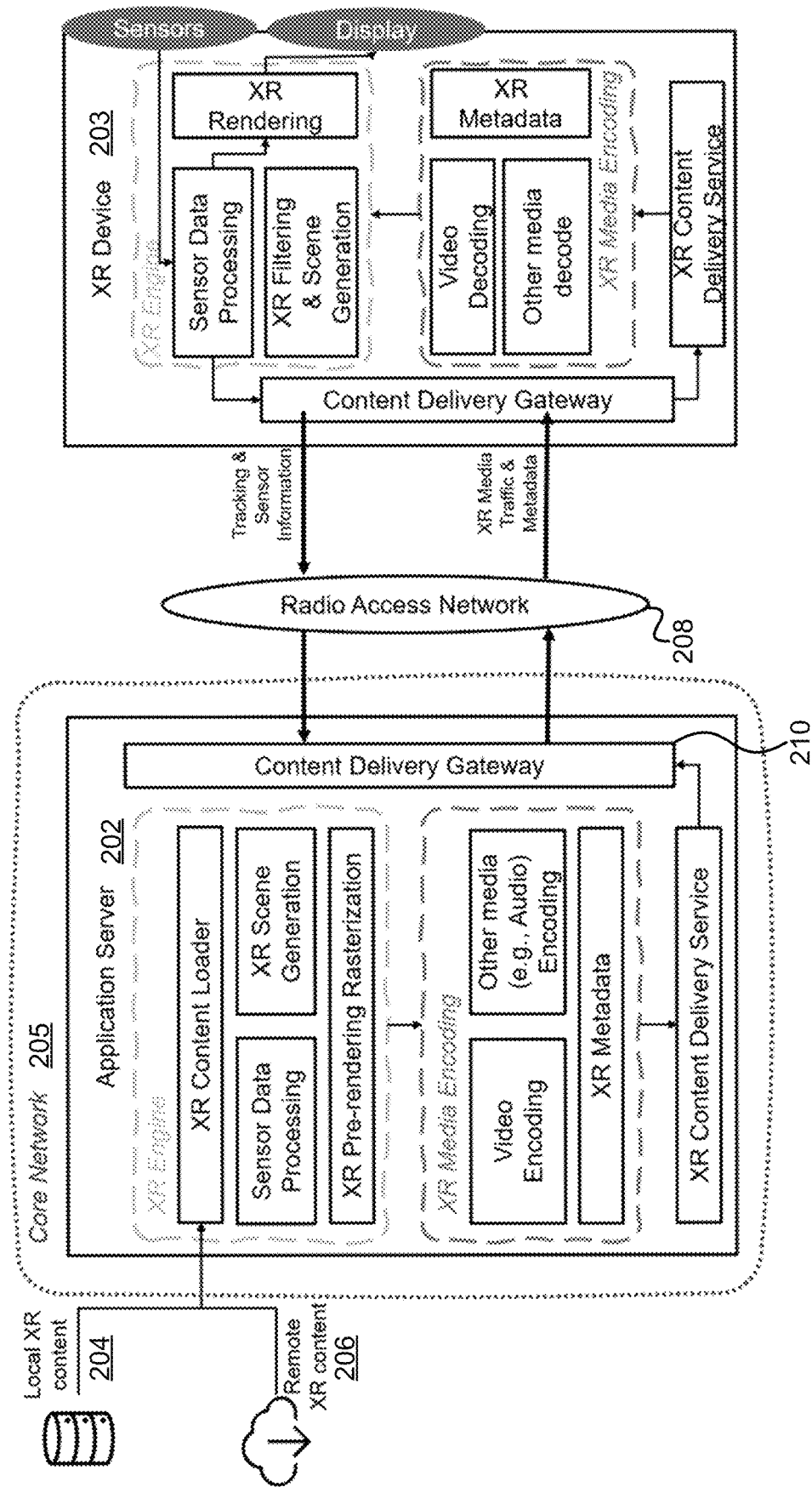
FIG. 2 depicts a split-rendering architecture for mobile networks based on an edge/cloud video application server and an XR UE device.

FIG. 2 depicts a split-rendering architecture for mobile networks based on an edge/cloud video application server and an XR UE device 203. The device 203 is connected to a radio access network 208, which is in turn connected to the application server 202 via a core network 205. The application server 202 may deliver XR media based on local XR processed content or on remote XR processed content. The processing may account for and/or further process tracking and sensing information as uplinked by the XR UE device 203. The application server 202 streams the XR multimedia content via a content delivery gateway 210 to which the XR UE device 203 is connected via any real-time transport protocol. The XR device 203, after decoding the XR content received from the application server 202, may use its XR engine 212 and additional local hardware/software capabilities and/or XR pre-rendered content, and XR associated XR metadata to locally render the XR content on a display.

In the depicted embodiment, the video application server 202 is used therefore to process, encode, transcode, and/or serve local 204 or remote 206 video content pertaining to an AR/XR/CGM/tele-operation application session to the XR UE 203. The video application server 202 may, as a result, encode/transcode and control the video viewport content and transmit it in downlink to the RAN 208 based on UE specific parameters, configurations and sensing inputs that may affect the rendering perspective, rate, quality, panning, etc. This general architecture is expected to leverage the advantages of various compute and network domains (e.g., cloud, edge, smart handsets/headsets) to enable scalable AR/XR/CGM/tele-operation applications and use cases with low-latency, high rate, and efficient energy usage. The architecture is as such universally applicable both to split rendering with asynchronous time warping devices, e.g., where the video application server encodes a rasterized pre-processed viewport representation to aid the UE, or to split rendering with viewport rendering at the device side, e.g., where the video viewport may be completely or partially rendered at the device side given the media encoded video content and its corresponding metadata available.

In one embodiment, related to video coding domain, the interactivity involving these applications requires guarantees in terms of meeting packet error rate ("PER") and packet delay budget ("PDB") for the QoE of rendering the associated video streams at a UE. The video source jitter and wireless channel stochastic characteristics of mobile communications systems make the former challenging to meet especially for high-rate specific digital video transmissions, e.g., 4K, 3D video, 2×2K eye-buffered video, and/or the like.

In one embodiment, current video source information is encoded based on 2D representations of video content. The encoded elementary stream video content is generally, regardless of the source encoder, organized into two abstraction layers meant to separate the storage and video coding domains, e.g., the network abstraction layer ("NAL"), and the video coding layer ("VCL"), respectively. The NAL syntax encapsulates the VCL information and provides abstract containerization mechanisms for in-transit coded streams, e.g., for disk storage/caching/transmission and/or parsing/decoding.

The VCL, on the other hand, encapsulates the video coding procedures of an encoder and compresses the source encoded video information based on some entropy coding method, e.g., context-adaptive binary arithmetic encoding ("CABAC"), context-adaptive variable-length coding ("CAVLC"), and/or the like. A simplified description of the VCL procedures to generically encode video content is as follows: a picture 302 in a video sequence is partitioned 304 into coding units (e.g., macroblocks, coding tree units or variations thereof) of a configured size. The coding units may be subsequently split under some tree partitioning structures (see ITU-T Series H: Audiovisual and Multimedia Systems: Infrastructure of Audiovisual Services—Coding of Moving video. Advanced Video Coding for Generic Audiovisual Services (H.264) (v08/2021); ITU-T Series H: Audiovisual and Multimedia Systems: Infrastructure of Audiovisual Services—Coding of Moving video. High Efficiency Video Coding (H.265) (v08/2021); ITU-T Series H: Audiovisual and Multimedia Systems: Infrastructure of Audiovisual Services—Coding of Moving video. Versatile Video Coding (H.266) (v08/2020)), e.g., binary/ternary/quaternary trees, or under some predetermined geometrically motivated 2D segmentation patterns (see de Rivaz, P., & Haughton, J. (2018). AV1 Bitstream & Decoding Process Specification. The Alliance for Open Media, 182, available at https://aomediacodec.github.io/av1-spec/av1-spec.pdf), e.g., the 10-way split.

In one embodiment, encoders use visual references among such coding units to encode picture content in a differential manner based on residuals. The residuals are determined given the prediction modes associated with the reconstruction of information. Two modes of prediction are universally available as intra-prediction 306 (shortly referred to as intra as well) or inter-prediction 308 (or inter in short form). The intra mode is based on deriving and predicting residuals based on other coding units' contents within the current picture, e.g., by computing residuals of current coding units given their adjacent coding units coded content. The inter mode is based, on the other hand, on deriving and predicting residuals based on coding units' contents from other pictures, e.g., by computing residuals of current coding units given their adjacent coded pictures content.

The residuals are then further transformed for compression using some multi dimensional (2D/3D) spatial multi-modal transform 310, e.g., frequency-based, or wavelet-based linear transform, to extract the most prominent frequency components of the coding units' residuals. The insignificant high-frequency contributions of residuals are dropped, and the floating-point transformed representation of remaining residuals is further quantized 312 based on some parametric quantization procedure down to a selected number of bits per sample, e.g., 8/10/12 bits. Lastly, the transformed and quantized residuals and their associated motion vectors to their prediction references either in intra or inter mode are encoded using an entropy encoding mechanism to compress the information based on the stochastic distribution of the source bit content. The output of this operation is a bitstream 316 of the coded residual content of the VCL. A simplified generic diagram of the blocks of a modern hybrid (applying both temporal and spatial compression via intra-/inter-prediction) video codec is displayed in FIG. 3.

Figure 3:
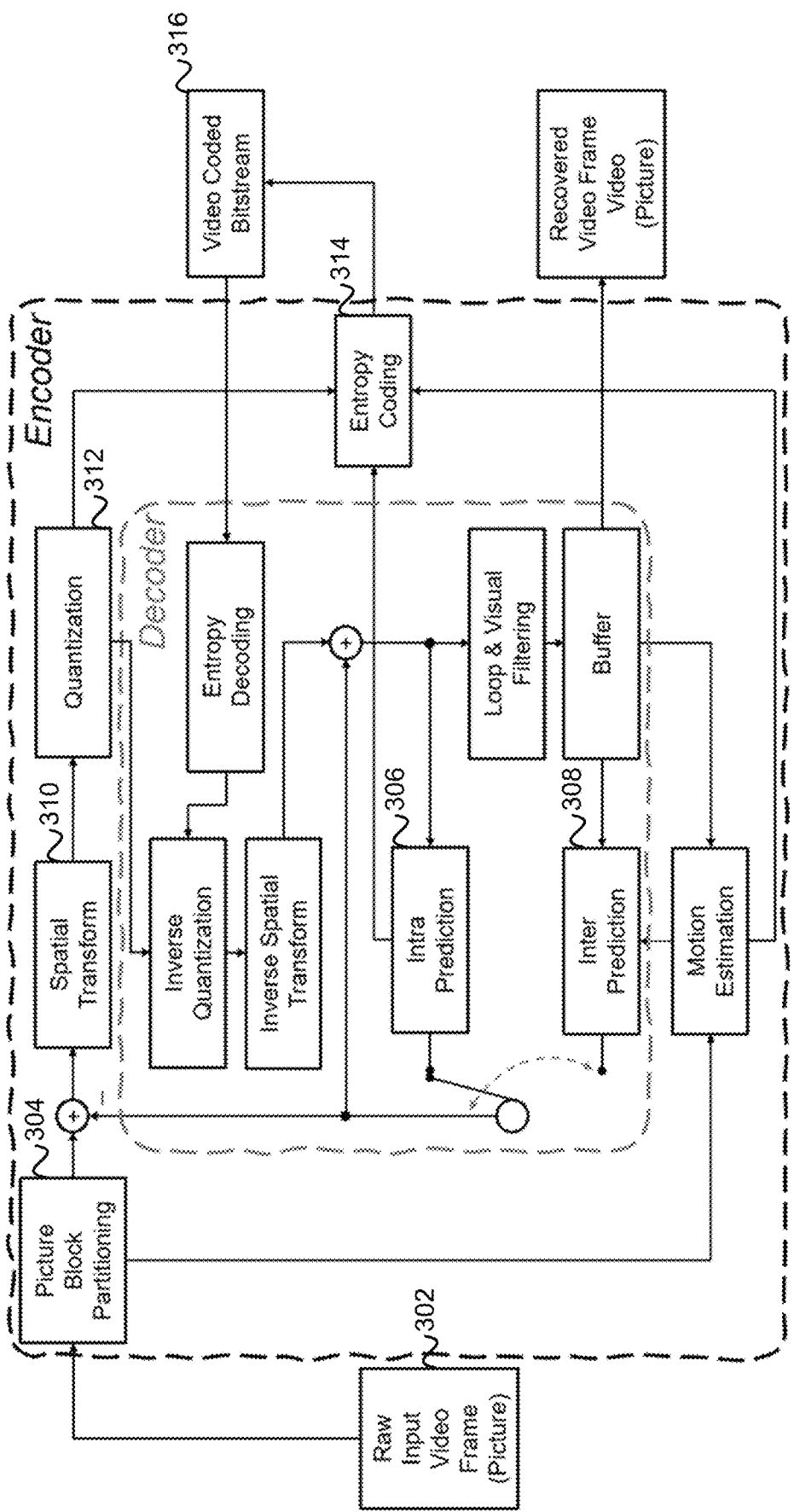
FIG. 3 depicts a simplified block diagram of a generic video codec performing both spatial and temporal (motion) compression of a video source.

FIG. 3 depicts a generic video codec performing both spatial and temporal (motion) compression of a video source. The encoder blocks are captured within the "Encoder" tagged domain. The decoder blocks are captured within the "Decoder" tagged light gray domain. One skilled in the art may associate the generic diagram from above describing a hybrid codec with a plethora of state-of-the-art video codecs, such as, but not limited to, MPEG-1, MPEG-2, MPEG-4 (generically referred to as MPEG-x), H.264, H.265, H.266 (generically referred to as H.26x) or VP8/VP9/AV1. As such, the concepts hereby utilized shall be considered in a general sense, unless otherwise specifically clarified and reduced in scope to some codec embodiment hereafter.

The coded residual bitstream is then encapsulated into an elementary stream as NAL units ready for storage or transmission over a network. The NAL units are the main syntax elements of a video codec and these may encapsulate encoded video metadata, e.g., video/sequence/picture parameter set ("VPS"/"SPS"/"PPS"), supplemental enhancement information ("SET") messages etc., and encoded video headers and residuals data, generically as picture slices (partitions of a picture, or equivalently, of a video frame). The encapsulation general syntax carries information described by codec specific semantics meant to determine the usage of metadata and video encoded data and aid the decoding process.

The NAL units' encapsulation syntax is composed of a header portion determining the beginning of a NAL unit and the type thereof, and a raw byte payload sequence containing the NAL unit relevant information. The NAL unit payload may subsequently be formed of a payload syntax or a payload specific header and an associated payload specific syntax. A critical subset of NAL units is formed of parameter sets, e.g., VPS, SPS, PPS, SEI messages and configuration NAL units (also known generically as non-VCL NAL units), and picture slice NAL units containing video encoded data as VCL information. An effective decoder may:

- implement a bitstream parser extracting the necessary metadata information and VCL associated metadata from the NAL unit sequence;
- decode the VCL residual coded data sequence to its transformed and quantized values;
- apply the inverse linear transform and recover the residual significant content;
- perform intra or inter prediction to reconstruct each coding unit luminance and chromatic representation;
- apply additional filtering and error concealment procedures; and
- reproduce the raw picture sequence representation as video playback.

These operations and procedures may happen successively, as listed, or out-of-order depending on a decoder specific implementation.

Moreover, robust decoders may consider the Group of Pictures ("GoP") structure and embedded synchronization information to implement error concealment mechanisms to conceal some of the visual artifacts resulted from potential errors in the video coded streams, either at syntactic level (bits), codec semantics level (video codec syntax elements) or synchronization level (temporal sequence of frames). By definition, a GoP represents a temporal sequence of video frames starting (or ending) with an intra-coded video frame (an I-frame) followed by plurality of forward predicted frames (P-frames) or bi-directional predicted frames (B-frames). A group of pictures parameter set is further described by its associated VPS NAL unit (containing video layer attributes characterization and encoder configuration), SPS NAL unit (containing sequence-level attributes characterization and encoder configuration), and PPS NAL unit (containing picture-level attributes characterization and encoder configuration). A summary of main video coded frames and slices (partitions of a frame) is provided within Table 1.

TABLE 1

Frame/slice type and generic characterization with respect to intra-/inter-prediction type according to common video codecs

| Slice type | Meaning and content | Generic importance | Rate-distortion behavior |
| --- | --- | --- | --- |
| I-Frame/I-Slice | May contain only intra-coded coding units | High L | High rate, loss severely distorts current picture and video coded sequence set referencing this slice |
| P-Frame/P-Slice | May contain only intra-coded and predictive inter-coded coding units | Medium | Low-medium rate, loss may distort to some degree the current picture and may affect video coded sequence set referencing this slice |
| B-frame/B-Slice | May contain intra coded and predictive/bi-predictive inter-coded coding units | Low | Low rate, loss might distort the current picture and might affect video coded sequence set referencing this slice |

In one embodiment, the error concealment mechanisms of state-of-the-art video decoders comprise two main procedures (see Zhang, F., & Bull, D. R. (2021). Intelligent image and video compression: communicating pictures. Academic Press.): temporal copying and motion compensated interpolated replacement. The temporal copying approach conceals corrupted video coded blocks of a current frame/slice at playback with copies of video coded blocks from reference frames/slices of the current frame/slice. On the other hand, the motion compensated, and interpolated replacement adaptively extends the temporal copying by means of motion compensation and intra-frame/intra-slice interpolation (via various kernels, e.g., such as radial basis kernels (see Shahriari, A., Fernando, W. A. C., & Arachchi, H. K. (2006, August). Adaptive error concealment with radial basis neuro-fuzzy networks for video communication over lossy channels. In First International Conference on Industrial and Information Systems (pp. 600-604). IEEE.)) utilizing the motion vectors available for the corrupted video coded blocks of a current frame/slice. These methods albeit simple provide effective rule-based and consistent error concealment for video coded block visual artifacts, yet in case of high error rates of block artifacts, such as is usual the case of wireless transmissions over packet-switched networks, their concealment capabilities do not manage to provide high quality visual reconstructions.

Lately, advances in computer and machine vision have been utilized in the context of image and video reconstruction. As such in the visual uncoded domain of still pictures or moving pictures (videos) deep learning methods such as convolutional neural networks ("CNNs"), long short-term memory ("LSTM") models, and combinations thereof (see Sankisa, A., Punjabi, A., & Katsaggelos, A. K. (2018, October). Video error concealment using deep neural networks. In 2018 25th IEEE International Conference on Image Processing (ICIP) (pp. 380-384). IEEE.) have been used to detect and conceal errors by 2D (e.g., horizontal, and vertical) optimal flow prediction within the uncoded pixel domain. Another approach to inpainting and blind visual recovery of corrupted/shaded blocks/regions of video frames has been proposed (see Gao, C., Saraf, A., Huang, J. B., & Kopf, J. (2020, August). Flow-edge guided video completion. In European Conference on Computer Vision (pp. 713-729). Springer, Cham.) where again the flow and edges of the dynamics within the video frames have been used as discriminants to conceal errors and remove selected portions within a GoP using deep learning fully connected models. The foregoing have achieved these results based on extensive training on sets of data of some similarity, e.g., similar scenery, background textures, color schemes, video dynamics.

In another embodiment, no learning from a data set may be required to perform Gaussian noise denoising, inpainting and deblurring of still pictures (see Ulyanov, D., Vedaldi, A., & Lempitsky, V. (2018). Deep image prior. In Proceedings of the IEEE Conference on Computer Vision and Pattern Recognition (pp. 9446-9454)). In one embodiment, this method utilizes stochastic gradient descent to train from generic noise input the fully connected deep learning model of the image prior such that a chosen dissimilarity metric between the corrupted picture and the reconstructed prior would be minimized. As such, the method yielded visually satisfying outputs and reconstructions, concealing the errors within the corrupted pictures by denoising, deblurring or inpainting close to the original pictures.

Both these trained and untrained approaches applying statistical learning frameworks and deep learning models gain increasing traction and their performance of satisfactory accuracy of visual recovery approaches the requirements of real-time applications. As such they become practically relevant for consideration within video communications applications alongside traditional receivers and video decoders.

Regarding 3GPP RAN overview and E2E XR (Video) transport architecture, in 5G NR RAN, as well as in previous releases of 3GPP, the RAN lower layers have no specific knowledge of the upper layer traffic, acting as a Data Radio Bearer ("DRB") over the physical wireless channels between a CN/data network and a UE. As such, no optimized decision can be taken in appropriately scheduling transmissions/retransmissions of associated traffic and controlling the rates of various application streams within high granularity and low-delay adaptability constraints of immersive media applications over highly mobile environments.

Interactive multimedia applications such as AR/VR/XR involving high-rate and low-latency constraints for transmission of video coded data synchronized to some user interaction is such a specific use case with a high QoE requirement. To serve alike applications reliably and robustly, a RAN may benefit from metadata and actionable insights into the AR/VR/XR video traffic required to transfer over the air.

Figure 4:
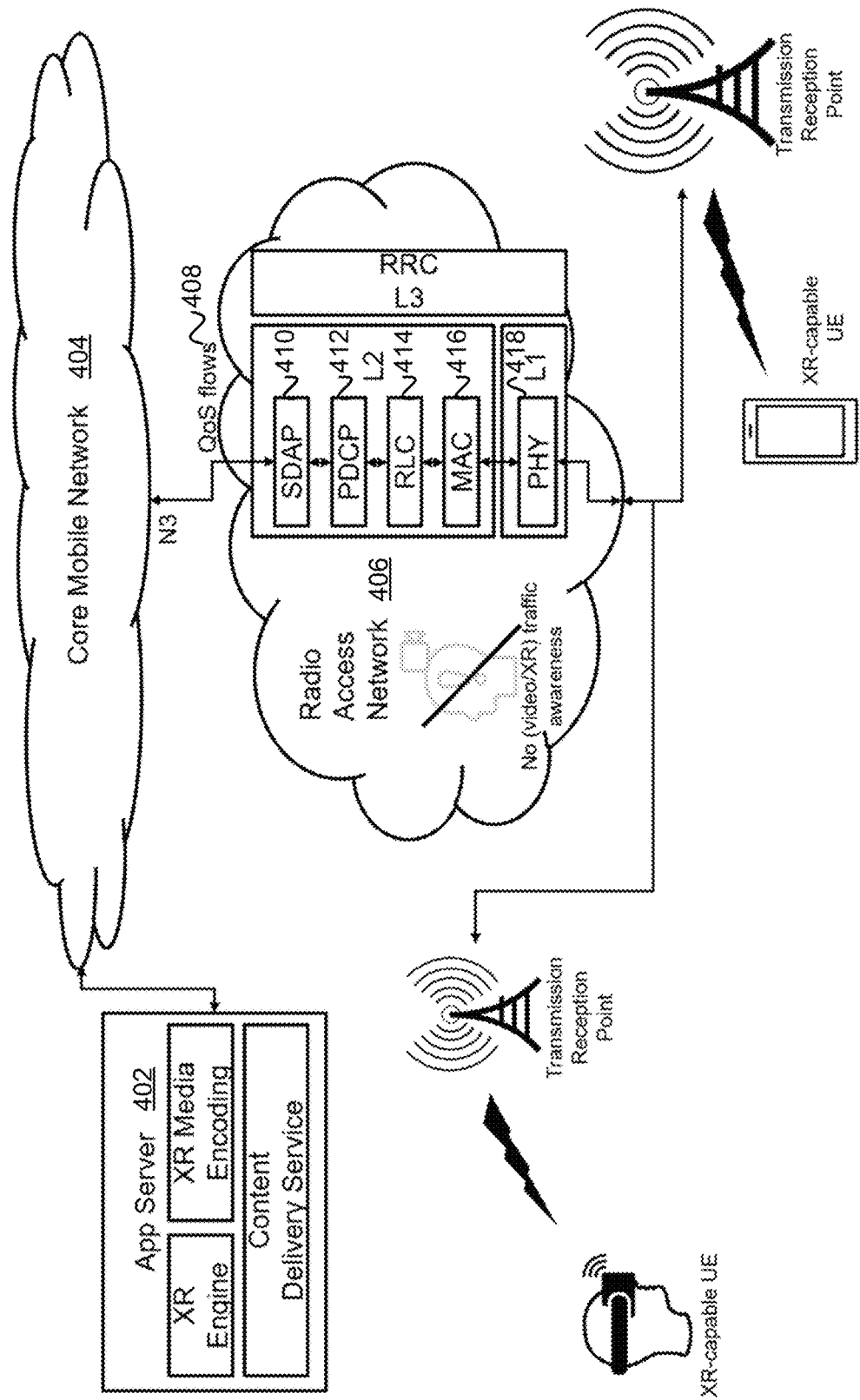
FIG. 4 depicts one embodiment of a communications systems architecture overview.

Certain embodiments, however, do not offer such capabilities and procedures. As illustrated in FIG. 4, the PDUs associated with an XR application session of an application server 402 connected to a CN 404 is transferred via the CN 404 UPF over the IP to the RAN 406. The multimedia traffic may be further supported by a real-time multimedia transport protocol such as a Real-time Transport Protocol ("RTP") or alike to handle jitter, packet loss and out-of-order deliveries that may occur within a typical IP network setup.

The QoS associated with IP packets of the XR traffic is handled by the CN 404 via QoS flows 408 generated at the UPF within the established PDU session. This procedure is opaque to the RAN 406, which only manages the mapping of QoS flows 408 associated with the received IP packets to their corresponding DRBs given the QoS profile associated with the indicators of each QoS flow 408. In a 5GS for instance the QoS flows 408 will be characterized by the 5QI (see 3GPP Technical Specification TS 23.501 (V17.2.0—September 2021). System architecture for the 5G System (5GS); Stage 2 (Release 17)).

This latter mapping of QoS flows 408 to DRBs is performed within the RAN 406 by the Service Data Adaptation Protocol ("SDAP") layer 410. The SDAP Service Data Unit ("SDU") is then processed by the Packet Data Convergence Protocol ("PDCP") 412 where among others header compression and ciphering are performed and the outputs further processed by the Radio Link Control ("RLC") 414. The RLC 414 may perform segmentation of the PDCP 412 SDUs and implements the automatic request response ("ARP") repetition retransmissions. The RLC 414 SDUs are then processed over the logical channels interfaces by the Medium Access Control ("MAC") layer 416, which handles the logical channels multiplexing, HARQ, scheduling and scheduling retransmission functions. Lastly, the MAC PDUs are combined over the transport channel into transport blocks ("TBs") at the level of PHY layer. The PHY handles the coding/decoding, rate matching, modulation/demodulation, radio resource mapping, multiantenna mapping and other typical radio low-level functions.

The PHY TBs, which are appended with their own Cyclic Redundancy Check ("CRC") of 16 or 24 bits blocks for detection of errors, are further partitioned into same-sized coding blocks ("CBs"). The CBs are appended as well by 24 bits CRC for error detection and following this operation they are forward error correction ("FEC") encoded by the PHY. The HARQ procedure within 5G NR ensures incremental redundancy retransmissions of an entire TB in case any of the CBs or TB CRC checks fails thus effectively ensuring reliability over the wireless link. In addition, given the increasing size of TBs, 5G NR also introduced a code block group ("CBG") construct to group one or more CBs into CBGs. The CBGs, if configured appropriately via the Radio Resource Control ("RRC"), support independent HARQ via Downlink Control Information ("DCI") signaling primarily via CBG Transmit Indicator ("CBGTI") and CBG Flush Indicator ("CBGFI") within the same HARQ process as the enclosing TB. As such, some mechanisms for versatile retransmissions are present in 5G NR to reduce retransmissions delays and resource utilization, applicable also to high-rate low-latency traffic such as immersive AR/VR/XR/CGM media applications. Yet these procedures are purely based on traditional FEC mechanisms, and bit-exact receiver decoding, which in practice reduces the retransmissions and associated resource utilization needs just in a very limited amount.

The RAN ensures therefore the syntactic correctness at bit level of the data traffic over the wireless media and solves the technical problem of the Shannon-Weaver's general Mathematical Theory of Communication (see Shannon, C. E. (1948). A mathematical theory of communication. The Bell system technical journal, 27(3), 379-423). According to the latter the goal of communicating a message across a communications system is split over 3 levels, the effectiveness level (concerned with "how effectively the received meaning affects conduct in the desired way"), the semantic level (concerned with "how precisely the transmitted symbols convey desired meaning"), and the technical level (solving "how accurately the symbols of communications be transmitted"), and moreover, the only design problem of a communications system shall be limited to solving only the technical level. Albeit this argument is the bedrock of any communications system available today, latest advances advocate for the emergence of a semantic communications framework (see Strinati, E. C., & Barbarossa, S. (2021). 6G networks: Beyond Shannon towards semantic and goal-oriented communications. Computer Networks, 190, 107930) to leverage the ever-increasing computational capacity and autonomy of operation of AI and ML towards increased better communication rates, latency reduction and overall spectral efficiency of future communications systems. As a result, it is of high interest to utilize the semantic level of communications and video coded traffic awareness to enhance the current RAN capabilities in supporting high-rate, low-latency immersive media applications without large overheads and retransmission requirements that may impact the latter's QoS requirements.

In general, as opposed to the current art of bit-exact communications, this disclosure proposes a novel approximate semantic communications solution to video coded digital communications systems serving high-rate low-delay video data streams. Thereby the bit-inexact communication of message bits is allowed to the extent where the reconstruction of bits at a receiver (post FEC decoding) following a transmission permits a prospectively noisy and distorted video reconstruction by a conventional hybrid decoder. Within the potential noisy and distorted first video reconstruction, the semantic video content is similarly an approximation of the original sent video content, potentially containing block noise and edge artifacts as a by-product of video decoding with potentially not bit-exact video coded data.

The visual artifacts, in one embodiment, are specific to the video decoder inner error concealment procedures as previously detailed. To correct for the latter and provide a genuine, high-quality, low-distorted reconstruction and convene the semantic meaning of the transmitted video coded message additional error correction over the video uncoded domain is performed. The latter step is defined as a video semantic error correction processing block wherein the intrinsic spatial-temporal joint distribution of the pixels within the video frames to be semantically reconstructed and corrected, and of the pixels in adjacent and referenced video frames is utilized to minimize a quantitative distortion metric (e.g., a minimum squared error ("MSE"), a p-norm, an entropy-based function etc.). As such, this intrinsic joint distribution acts as the prior information and is utilized by means of machine vision algorithms and trained or non-trained (wherein training is referred to the act of supervised optimization of a neural network's components based on a training set forming a common category with the object inputs) neural networks to obtain a semantic error-corrected version of the original image. The post-processing shall thus aid in correcting artifacts (e.g., by means of denoising, prior-driven inpainting applied either at block, sub-picture or picture level), such as block Gaussian noise, block correlated noise, edge noise and decoding artifacts that hybrid video decoder error concealment could not resolve alone.

This two-step video error concealment determines a smart video decoder, which can be leveraged by novel video coded communications systems by means of the approximate semantic communications model briefly introduced and described above, and further outlined in FIG. 5. At the video semantic level applicable to the framework of semantic communications (see Shannon, C. E. (1948). A mathematical theory of communication. The Bell system technical journal, 27(3), 379 423.; Strinati, E. C., & Barbarossa, S. (2021). 6G networks: Beyond Shannon towards semantic and goal-oriented communications. Computer Networks, 190, 107930) hereafter the proposed solution set contains of a knowledge base 502, a video semantic encoder 504 and a video semantic decoder 508.

The knowledge base 502 determining the semantic encoding/decoding procedures of the video semantic information to video messages is represented by a video codec specification used to encode a raw uncoded video source. This is a consequence of the operation methodology of modern hybrid video codecs where semantics are inherently considered within the encoding process given the recursive block partitioning of pictures and the spatial-temporal prediction models. Albeit not ontologically labelled, the latter video semantic elements, and structures thereof, are embedded into the compression/decompression procedures and extending the prior knowledge embedded semantically within a specific group of video frames up for semantic error correction. An example of knowledge base embodiments is the H.26x family of Motion Pictures Experts Group (MPEG) video codecs (e.g., H.264, H.265, H.266).

The video semantic encoder 504 is therefore represented by an associated video codec encoder given the video codec knowledge base realization. Whereas the video semantic decoder 508 is a smart video decoder, as defined above, wherein the first video decoder processing component is represented by an associated video codec decoder 506 given the video codec knowledge base realization, and the second semantic error correction block 510 is possibly jointly optimized with the video codec knowledge base and/or corresponding first video decoder processing component.

Figure 5:
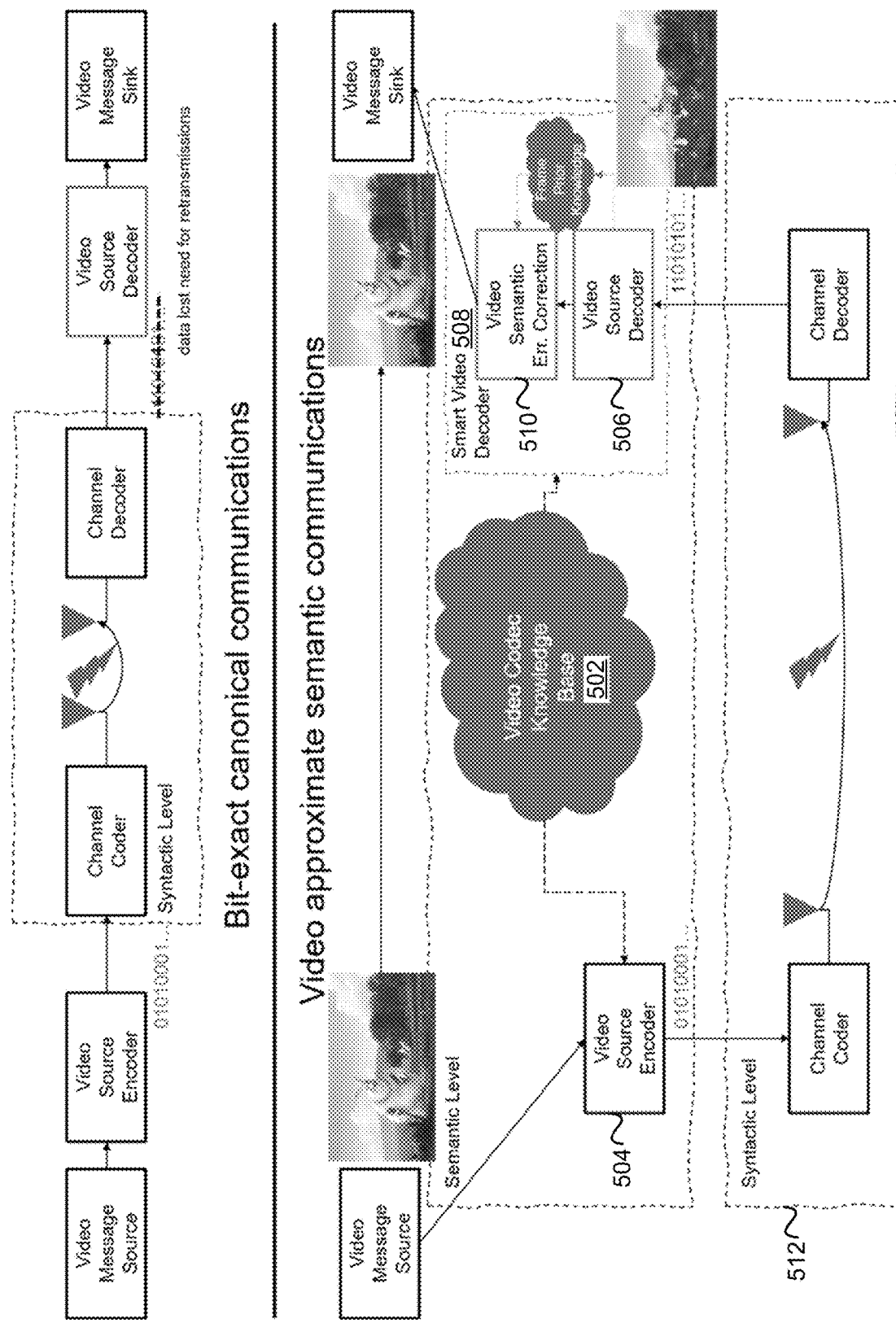
FIG. 5 depicts a comparison overview of current systems (top as bit-exact canonical communications systems) and the proposed system (bottom as video approximate semantic communications by semantic error correction)

As seen in the bottom side of FIG. 5, a communication system 512 is presented that is applicable to video coded traffic of immersive, high-rate and low-latency applications such as AR/VR/XR/CGM that embodies the approximate semantic communications methodology hereby briefly described that differentiates from conventional methods of bit-exact communication systems in allowing certain level of bit-errors post-FEC channel decoding and applying the necessary level of correction and reconstruction at a semantic level instead. The methodology of such approaches, in one embodiment, pays prospective dividends in reduced HARQ process load, reduced retransmission needs, dynamic modulation and coding scheme ("MCS") for rate adaption, and general optimization of radio resource utilization. To this extent, following high-level steps (that may be broken down into multiple lower-level steps and associated signaling as detailed in the following embodiments) are necessary:

- an indication to a transmitter of a receiver's capabilities for semantic error correction;
- a transmission from a transmitter to a receiver of video coded stream comprising of approximate semantic communications, wherein the receiver applies a smart video decoder with embedded semantic error correction to reconstruct the sent video semantic content
- an enhanced signaling indication of HARQ acknowledgement feedback in support of the approximate semantic communications of bit-inexact data post-FEC channel decoding.

Figure 6:
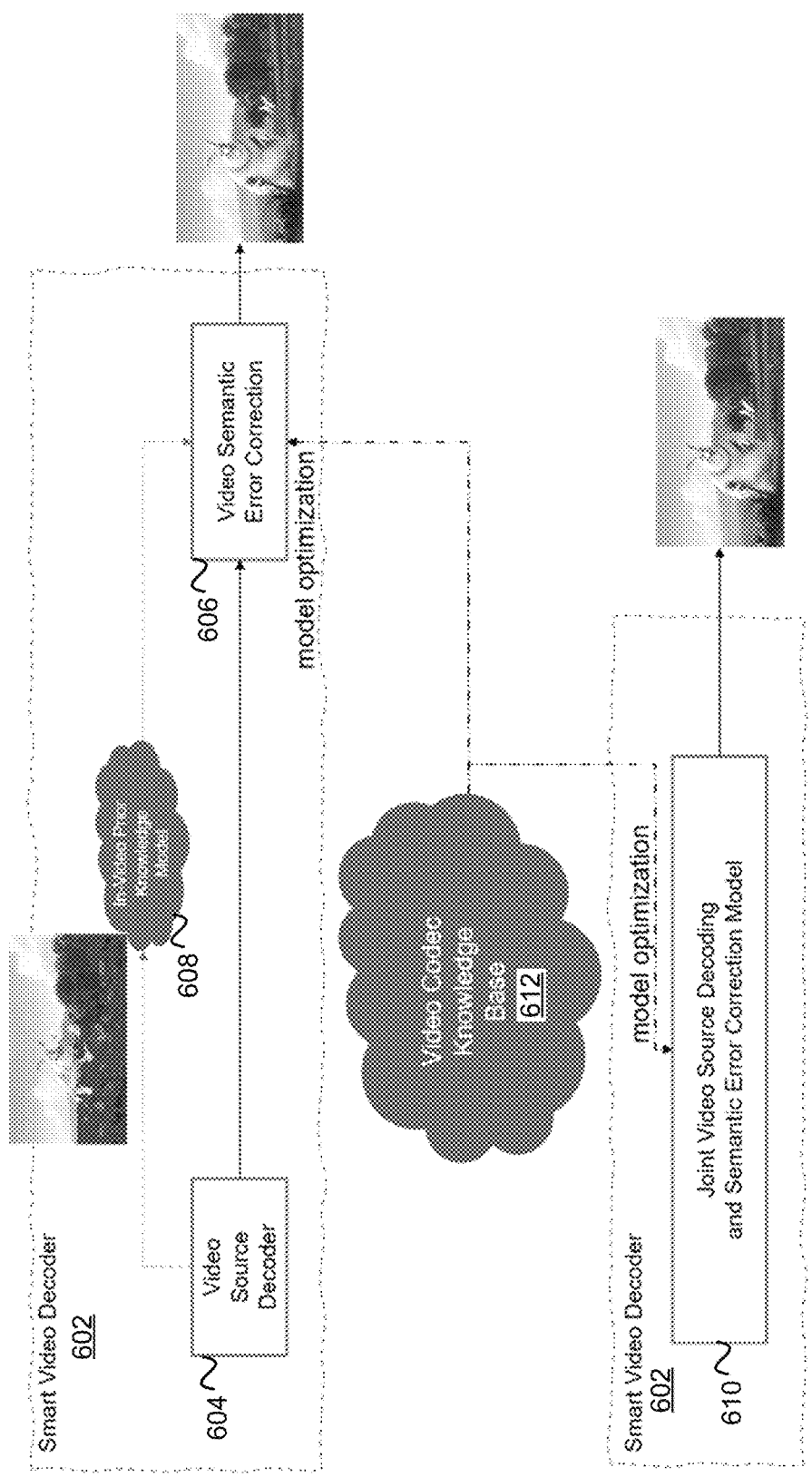
FIG. 6 depicts one embodiment of a smart video decoder with embedded functionality for semantic error correction in support of video approximate semantic communications.

In one embodiment, shown in FIG. 6, which depicts a smart video decoder with embedded functionality for semantic error correction in support of video approximate semantic communications where the top is a realization of a smart video decoder with separate video source decoding and semantic error correction steps and the bottom is a realization of a smart video decoder as a singular joint video source decoding and semantic error correction model, a smart video decoder 602 at a receiver, as defined, consists of the capabilities to decode a video coded stream and to apply successive semantic error correction on the decoded video content to conceal any visual artifacts as by-product of bit-wise errors within a received video coded stream considered as input. In one embodiment, the required processing of a smart video decoder may be split between two processing blocks, a first hybrid video decoder 604 implementation and a second semantic error correction block 606 for advanced visual error concealment, wherein the block may consist of an in-video prior knowledge module 608, which may be a learned model and/or a non-learned prior-driven model for semantic inference and error correction for the advanced video error concealment. The latter processing block's sub-components may be optimized given the knowledge base semantics of the video codec specification. In such examples, the second processing block of a smart video decoder 604 may be bypassed in terms of active processing for purposes of semantic error correction when the video coded input stream is received without syntactic errors, e.g., bit-exact, as its originally sent counterpart.

On the other hand, in some embodiments, the smart video decoder 602 may be a singular video neural decoder model 610, jointly optimized to fulfill the defined functionality of the smart video decoder, e.g., to perform joint video codec decoding and semantic error correction for advanced visual error concealment. In such examples, the knowledge base semantics 612 (e.g., the video codec specification semantics) of the video codec syntax elements are applied to conceal video error locations within detected erroneous blocks of bits (detected for instance by means of PHY FEC decoding-based signaling) in the video coded bitstream and thus semantically correct errors within the NAL units' headers and payloads. The semantic error correction of such an embodiment of the smart video decoder is therefore inherently and jointly optimized based on cached (e.g., a video codec specification) and/or prior (e.g., one or more previously decoded/concealed video frames) knowledge base information as part of one neural model 610. A schematic of such realizations of the defined smart video decoder is provided in the bottom side of FIG. 6.

As the smart video decoder 602 as a receiver provides the set of functions necessary to support the semantic reconstruction of the video content beyond bit-exact inputs, knowledge of the capabilities and extent of tolerated errors is detrimental for a transmitter to optimize video transmissions/retransmissions and associated radio resource allocations. The capabilities of the receiver in terms of a smart video decoder are therefore of interest to be indicated for a RAN implementation. Therefore, from a RAN perspective a supported UE capabilities undergoing video approximate semantic communications may be leveraged in controlling the HARQ retransmission process, feedback outer loop adaption, scheduling decision given a tight PDB QoS flows budget, energy efficiency optimization by optimized (discontinuous reception) DRX configuration of UEs or optimization of the mobility management for immersive and interactive media applications such as AR/VR/XR/CGM.

In one embodiment, the capabilities of a UE with a smart video decoder 602 supporting video approximate semantic communications to be reported comprise of at least one of:
an enablement flag as a one-bit indicator (e.g., SEC_ON, SEC_OFF) representing that the video semantic error correction necessary for the video approximate semantic communications is enabled or disabled;
a maximum error rate threshold that the semantic error correction functionality of the video approximate semantic communications mode can tolerate and semantically correct video errors for in order to achieve a fixed video average reconstruction quality given a fixed quality indicator criterion (e.g., minimum MSE ("MMSE"), Peak Signal-to-Noise Ratio ("PSNR"), structural similarity index ("SSIM"), video multi-method assessment function ("VMAF") or equivalent metrics);
a statistical running window configuration over which the error rate statistic is monitored (e.g., aggregated) and compared with the maximum error rate threshold of the semantic error correction functionality in semantically correcting video errors to achieve a fixed video average reconstruction quality, whereas the statistical running window configuration is determined by at least a type of error unit monitored post FEC decoding (e.g., PHY block error rate ("BLER") at a CBG/TB level, aggregated log-likelihood ratio ("LLR") at a CB, CBG or TB level and/or alike PHY transport units error statistic describing the binary decision making between an erroneous PHY transmission and a non-erroneous PHY transmission) and a length thereof;
a maximum processing delay, wherein the maximum processing delay can be further split into a video decoding processing delay and a video semantic error correction processing delay;
an average energy consumption indicator estimation, wherein the estimate of average energy consumed may comprise of a first component estimate of average energy consumed with the semantic error correction enabled and a second component estimate of average energy consumed with the semantic error correction disabled;
a power source indicator as a one-bit indicator determining the type of power used (e.g., a '0' indication for ON_BATTERY and a '1' indication for ON_AC, e.g., powered by AC current source);
an indication determining the maximum video frame mobility and change rate (e.g., no-mobility video frames, i.e., still scene without change, low-mobility video frames, medium-mobility video frames, or high-mobility video frames), that the semantic error correction functionality can tolerate and process to achieve successfully a fixed video reconstruction quality; and
a standalone operation flag as a one-bit indicator describing whether the UE requires assistance from the RAN, more specifically from a gNB, to monitor the transmission errors within a configured statistical running window and to enable/disable accordingly given its own capabilities the semantic error correction, or alternatively, that the UE handles all these steps in a standalone manner, i.e., not assisted.

In some embodiments the semantic error threshold is indicated as a coding BLER determined based on the reported number of CBGs/TBs errors. In one embodiment this metric is monitored across a window of one or more encapsulating TBs. In another embodiment, the statistical running window over which this metric is monitored may be configured to the level of CBGs or any dynamic segmentation of at least one TB.

In other embodiments, the semantic error threshold is indicated as an LLR determined based on LLR indicators corresponding to individual CBs. In one embodiment these individual LLRs can be further aggregated to provide a common LLR indicator across a window of one or more encapsulating TBs. In another embodiment, the statistical running window across which a common LLR indicator statistic can be further aggregated is configured to the level of CBGs or any dynamic segmentation of at least one TB. In some examples, the weights associated with the common aggregated LLR indicator statistic over the running window may be unequally determined by an implementation specific criterion (e.g., size of the associated CBs, importance indicator of the associated CBs for XR/video traffic importance-aware transmissions, and/or the like).

In a video coded traffic-aware embodiment, (wherein the awareness is defined as knowledge of the lower-level RAN, e.g., MAC/PHY, of NAL units' boundaries and/or importance thereof, and/or type of video frames, such as I-frame/P-frame, or the like), the semantic error threshold is indicated based on NAL units' error rate ("NALuER"). In such an example this metric is monitored across one or more TBs containing the identified NAL units. In some embodiments, NAL units or segments thereof, required for synchronization of decoding operations and error concealment tasks, e.g., access unit delimiter, NAL VPS, NAL SPS, NAL PPS, are to be transmitted bit-exact and for this purpose the encapsulating PHY transport elements, e.g., TBs/CBGs, are undergoing current art HARQ process procedures requiring retransmissions pending non-acknowledgement ("NACK") signaling from the receiver for post FEC erroneous decoding.

The UE capabilities to support video approximate semantic communications are reported, in one embodiment, semi-statically by means of a bit field within the RRC signaling over a Physical Uplink Control Channel ("PUCCH"). In some embodiments such capabilities to support video approximate semantic communications are updated via a bit field within at least one of an Uplink Control Information ("UCI") signaling, a UCI scheduling request over the PUCCH for the Physical Uplink Shared Channel ("PUSCH"), and/or the like.

In some embodiments, the transient video semantic error correction enablement is configured dynamically by a gNB over one of a DCI bit field over the Physical Downlink Control Channel ("PDCCH"), a DCI signaling over the Physical Downlink Shared Channel ("PDSCH") or a MAC Control Element ("MAC-CE") signal, such that the enablement flag is set to SEC_ON to enable approximate video semantic communications with a supporting UE, or respectively, is set to SEC_OFF to disable approximate video semantic communications with a UE. In other embodiments, the UE may indicate to the gNB its readiness/willingness to switch to approximate video semantic communications mode by setting the enablement bit to SEC_ON within one of a UCI scheduling request over a PUCCH and a bit field MAC-CE signaling. However, in such embodiments the gNB decides finally whether the request for SEC_ON from the UE is accepted by signaling over to the UE the final state of the enablement bit in one of a following DCI bit field or a MAC-CE signaling. On the other hand, in other embodiments, the UE may indicate to the gNB its transient lack of support for approximate video semantic communications mode by setting the enablement bit of semantic error correction to SEC_OFF within one of a UCI bit field signaling over PUCCH, a UCI signaling for a data communication over the PUSCH or a bit field MAC-CE signaling.

In some embodiments, the UE driven requests for enabling/disabling the video approximate semantic communications mode may be subsequently supplemented by one of a UCI bit field or a MAC-CE bit field containing a reason for the request. In one example, such a bit field comprises a one-bit field corresponding to an indicator for the associated UE power source state. As such, two-bits tuple requests of (SEC_ON, ON_AC) or (SEC_OFF, ON_BATTERY) may be received by a gNB to justify the UE invoked switch of semantic error correction and implicit the support for video approximate semantic communications mode.

Depending on the video coded traffic direction of an immersive media application, the solution space of a video approximate semantic communications systems, as defined in the prequel, is separated into two categories. These are namely the one representing the DL direction (where a gNB within a RAN serves with video coded traffic a UE whose configuration may enable the video approximate semantic communications mode), or on the other hand, the UP direction (where a video media capturing UE transmits video coded traffic data to a gNB within a connected RAN, whereby the RAN/gNB or a video coded traffic data endpoint have the capability and afferent delay budget of video approximate semantic communications via semantic error correction).

Treating the DL communications direction, in one embodiment, where the UE has embedded support for the video approximate semantic communications mode and this is enabled by one of the procedures previously described, the RAN may assist the UE and take decisions whether to retransmit erroneously transmitted information by means of the HARQ process associated with a TB served to the UE. The latter decision is based on the HARQ feedback reported by the UE and its granularity (e.g., per TB or CBG, given that the CBG HARQ retransmission configuration has been appropriately configured conform (see 5.1.7.2 of 3GPP Technical Specification TS 38.214 (v16.5.0—April 2021). 5G; NR; Physical layer procedures for data) via the CBGTI over DCI signaling, respectively). As such RAN-assistance for UEs in video approximate semantic communications is provided for some UEs of reduced implementation complexity.

As such, in some embodiments, the decisions to retransmit CBGs and/or TBs are made solely by the RAN given the feedback received at a gNB from the UE, and the knowledge the RAN has of the respective UE video semantic error correction capabilities and enablement status. The UE transmits therefore the regular HARQ feedback associated with current art 5G NR based on the CRC checks performed on a per CB/per TB basis, and consequently, given the RAN available configuration of the video approximate semantic communications mode of the UE, the RAN determines whether any retransmission is necessary.

Figure 7:
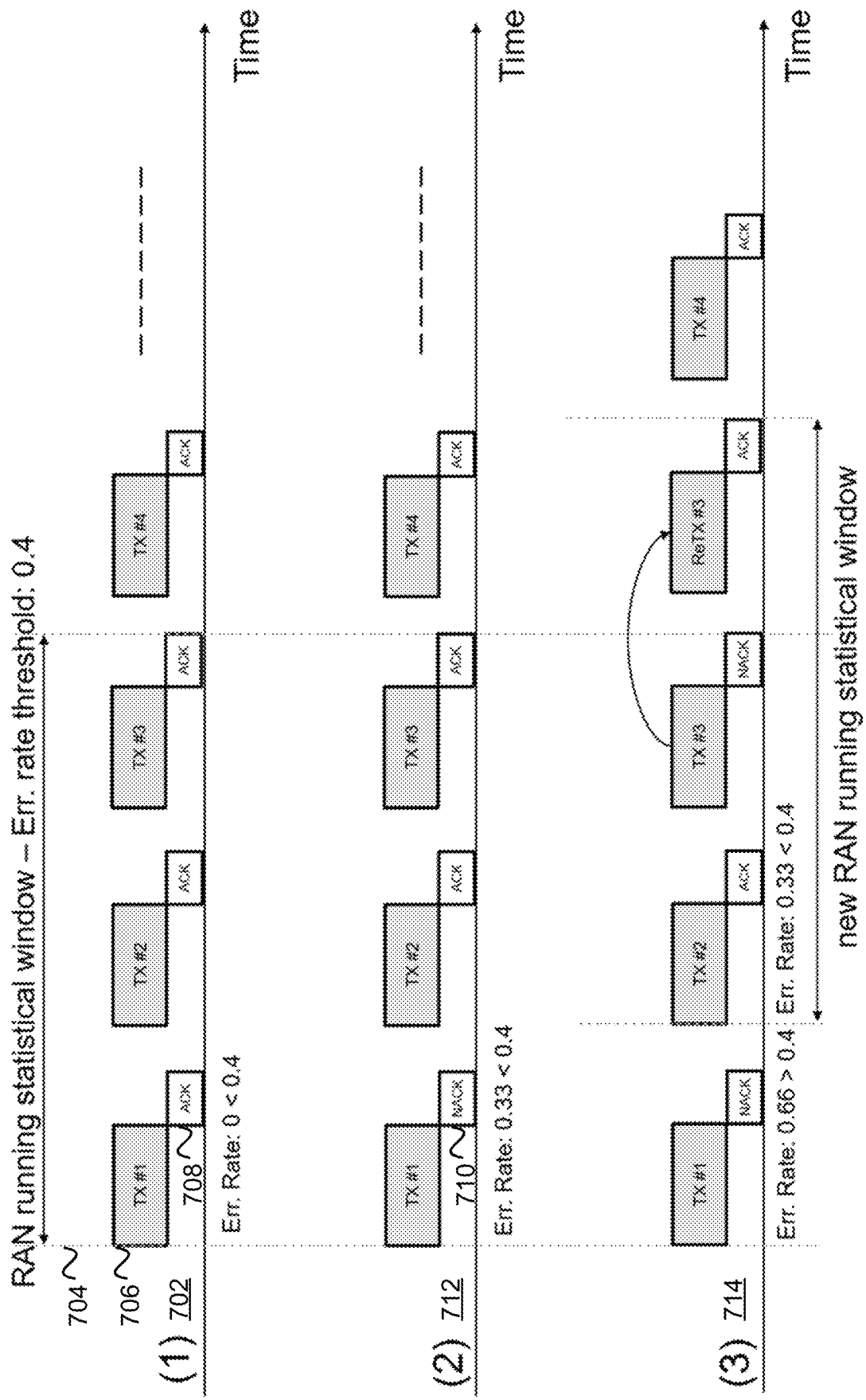
FIG. 7 depicts one embodiment of RAN level support for monitoring of HARQ processes and retransmissions for gNB-assisted video approximate semantic communications in DL.

FIG. 7 depicts one embodiment of RAN level support for monitoring of HARQ processes and retransmissions for gNB-assisted video approximate semantic communications in DL. Example considers an error rate threshold of 0.4 for semantic error correction and a statistical running window of 3 transport units (e.g., CBGs/TBs). Three examples are presented: (1) no errors are encountered—regular operation, (2) errors do not exceed configured error rate threshold—no retransmissions needed as semantic error correction applied, (3) errors do exceed configured error rate threshold—retransmissions needed to apply semantic error correction.

In one example, as presented in FIG. 7 (1) 702, if all the CBGs/TBs 706 within a running window 704 for statistical aggregation are ACKed 708, the RAN proceeds regularly with scheduling for transmission of upcoming fresh transmissions as no data has been corrupted. In another example, presented in FIG. 7, if some CBGs/TBs 706 within a running window for statistics aggregation on the RAN side are NACKed 710, and the rest ACKed 708, the RAN computes the statistics according to the type of threshold supported by the UE (e.g., in terms of BLER, in terms of aggregated LLR indicator or in terms of NALuER). Given the latter statistics determination at the RAN over the configured monitoring running window, the RAN compares the statistical result with the semantic error correction threshold achievable by the associated UE.

In some examples, as portrayed in FIG. 7 (2) 712, if the RAN computed statistical result is lower than the UE semantic error correction threshold indicator, the RAN decides not to subsequently retransmit any CBGs/TBs 706 and UE is responsible to apply semantic error correction to the bit-corrupted video frames to conceal the existing error artifacts remaining post-decoding. As the semantic meaning posterior to semantic error correction at the video frame/picture/sub-picture level is reconstructed approximately close to the originally transmitted video information within the reported semantic error correction threshold, no further retransmissions of the corrupted data are necessary. The UE is responsible thus to recover the semantic video meaning of the originally sent messages. This operation may be performed autonomously by the UE in some embodiments, whereas in other embodiments an explicit indication by the gNB may be signaled via at least one of a Demodulation Reference Signal ("DM-RS") embedded signaling part of the originally transmitted TBs 706 over the PDSCH, and a dedicated DCI bit field signaling over the PDCCH.

In other examples, as shown in FIG. 7 (3) 714, if the RAN computed statistical result is greater or equal to the UE semantic error correction threshold indicator, the RAN decides to retransmit a plurality of CBs as one or more CBGs/TBs 706 (upon a determined video approximate semantic communications statistical window configuration and HARQ configuration), covering the corrupted CBGs/TBs such that either the statistical error at least decreases below the semantic error correction threshold or, equivalently, all the errors are corrected by the retransmissions. In some examples therefore, segments of TBs 706 may be retransmitted by a gNB individually as CBGs given prior enablement of the CBGTI flag within the DCI scheduling prior to the said TBs transmission, e.g., according to the procedures of 5.1.7.2 of 3GPP Technical Specification TS 38.214 (v16.5.0—April 2021). 5G; NR; Physical layer procedures for data.

In some embodiments, to support the UE semantic error threshold type (e.g., BLER, LLR, NALuER indication, or the like), the RAN performs the operations of mapping the HARQ feedback reported by the UE to the respective semantic error correction threshold measure type. To acquire the necessary granularity to perform such calculations, the RAN may need additional HARQ feedback information from the UE. In one example, where the semantic error correction threshold of the UE is determined based on the BLER, the gNB may therefore simply enable CBG HARQ feedback with multiple bits (one bit per each CBG within a TB) via CBGTI, e.g., according to 5.1.7.2 of 3GPP Technical Specification TS 38.214 (v16.5.0—April 2021). 5G; NR; Physical layer procedures for data.

On the other hand, in other embodiments, each unit of the UE HARQ feedback report may contain a multiple bit depth description of the channel decoding procedure outcome (ACK/NACK) as a soft component. To this extent, a floating-point representation normalized to the interval 0 to 1, where 0 quantifies a completely uncertain event and 1 quantifies a completely certain event, or equivalently an indexed/quantized specification thereof, may quantifies in some examples the ACK/NACK reports and their confidence, as a tuple of the form (ACK/NACK, ACK/NACK statistical confidence), as (HARQ feedback bit, HARQ feedback confidence bits), wherein the latter part is directly linked to the CBs aggregated LLR across a unit of HARQ feedback (e.g., CBGs/TBs). In some examples, these confidence levels may be split by quantization into two stages, e.g., LOW_CONF, HIGH_CONF for a 2-bit wide representation of all possible tuples, whereas in some other examples a finer level of granularity may be utilized, e.g., LOW_CONF, MEDIUM_CONF, HIGH_CONF for up to a 3-bit wide representation of all possible HARQ feedback tuples.

In addition, in some embodiments for which the semantic error threshold of a UE is expressed based on an LLR or a NALuER indication, the HARQ feedback is further extended to multibit feedback per each CB to allow the gNB to better track the required statistics required for the decision making at either an LLR or a NALuER (in case of video coded traffic-aware embodiments) level. For a compacted representation, the tuple may be mapped to a bitfield representation based on an indexed/tabulated representation of quantized confidence intervals. This extended HARQ signaling from the UE to the gNB shall be reported over to the PUCCH via HARQ dedicated UCI resources. Furthermore, the configuration of CB-wise reporting may be signaled by appropriate configuration of a number of CBGs to the number of CBs in the TB, e.g., conform to 5.1.7.1 of 3GPP Technical Specification TS 38.214 (v16.5.0—April 2021). 5G; NR; Physical layer procedures for data, signaled via the CBGTI within the DCI scheduling request over PDSCH.

As the energy consumption of a semantic error correction block may be significant for battery-powered immersive media playback devices, e.g., AR/VR glasses, 3D light field displays, and/or the like, in one embodiment, the UE can report to the gNB additional status indications of its energy levels which may influence its capabilities to perform semantic error correction and to operate within the video approximate semantic communications mode. As such, in some embodiments, the UE may indicate to the gNB transient semantic error correction capabilities per video coded stream bases whereby the ACK/NACK report for a stream served over a DRB is extended to include the setup of the semantic error correction enablement flag and a battery 1-bit indicator.

In one example where the semantic error correction enablement bit is set, e.g., SEC_ON, a battery indicator BATT_CRIT, e.g., set to '1', indicates that the UE battery level has dropped under a threshold where multiple video coded stream support for video approximate semantic communications is disabled and only one stream/DRB process can undergo semantic error correction. Alternatively, if BATT_OK, e.g., set to '0', normal operation of semantic error correction within the domain of the UE smart video decoder is possible given the enablement flag configuration, e.g., enabled as SEC_ON, or disabled as SEC_OFF. Lastly, in some embodiments where the semantic error correction enablement flag is SEC_OFF and the battery indicator is BATT_CRIT, the UE signals therefore to the gNB that the semantic error correction is not possible for any video coded stream DRB given the current battery status which dropped below a minimum supported threshold. The associated indication of joint semantic error correction enablement flag and battery status indicator, summarized in Table 2, may be signaled by at least one of a UCI bit field indication as part of a grant scheduling request, a UCI bit field indication as part of a HARQ feedback enhanced information tuple, and a MAC-CE indication for semi-static update of the UE capabilities.

TABLE 2

Collection of video semantic error correction and battery status capabilities and associated signaling for energy-aware video approximate semantic communications

| Case | Semantic error correction enablement flag | Battery status indicator flag | Associated signaling meaning |
|---|---|---|---|
| 0 | SEC_ON | BATT_OK | Normal UE operation with enabled video semantic error correction |
| 1 | SEC_ON | BATT_CRIT | Reduced UE operation of enabled video semantic error correction for only one video coded stream |
| 2 | SEC_OFF | BATT_OK | Disabled semantic error correction with UE battery supporting normal semantic error correction operation |
| 3 | SEC_OFF | BATT_CRIT | Disabled semantic error correction with UE battery supporting reduced operation of semantic error correction for only one video coded stream. |

Based on the signaling described in Table 2, energy-awareness of a UE supporting video approximate semantic communications is provided to the gNB and to its corresponding RAN, which subsequently may utilize the embedded information for optimization of energy-efficient low-level RAN scheduling, procedures and protocols pertaining to video coded traffic of immersive, high-rate, low-latency advanced AR/VR/XR/CGM applications.

In some embodiments, a RAN implementation may further support UE-side error concealment of video coded traffic by predictive caching of on-demand keyframe (e.g., I-frame/I-slices video coded data) at the gNB side or by predictive filtering of enhancement layers to meet set QoS flows requirements of PER and PDB and consequently lower the frame/slice error rate of the video coded data traffic.

As such, in one embodiment, a delay-aware scheduler monitors and determines dynamically the probability of reaching a QoS flow fixed PER, e.g., $\epsilon_{PER}$, (determining a desired over-the-air transmission video frame/slice error rate) within a latency time constraint $\tau$ lower than the QoS flow PDB given the wireless link and traffic available statistics at a gNB. Consequently, the conditional probability measure $P(\tau \leq PDB | \epsilon_{PER} = PER)$ is estimated. Based on this estimate, the RAN may detect a violation of the (PDB, PER) conditions set and on-demand request from the application server a concealment (keyframe) video coded frame/slice as an I-frame/I-slice to be transmitted to UE and stop video error propagation, thus concealing the latter. The on-demand requested keyframe is then cached within the RAN for transmission by a gNB in support of video error concealment to a UE with or without support of an enabled semantic error correction as previously detailed. The latter procedure is applicable provided that the on-demand keyframe request service time is small enough and does not violate therefore with high probability the PDB constraint of the associated QoS flow of the video coded traffic.

In another embodiment, whereby multi-layered video coded data traffic is being transported over a RAN to a UE, the same conditional probability measure $P(\tau \leq PDB | \epsilon_{PER} = PER)$ is used by a video coded traffic-aware implementation to determine whether the transmission of the multi-layered video coded data traffic violates the QoS flow constraints. In such an example the latency ($\tau$) and error rate ($\epsilon_{PER}$) are affinely weighted combinations of the expected associated video coded layers latencies and error rates (given the wireless link statistics and selected MCS), respectively, whereby the affine weighting coefficients are determined based on the data rates associated with each video coded layer, e.g., $$\tau \triangleq \sum_{0 \leq i < L-1} w_i \tau_i \qquad \text{Eq. 1}$$

$$\epsilon_{PER} \triangleq \sum_{0 \leq i < L-1} w_i \epsilon_{PER,i} \qquad \text{Eq. 2}$$

wherein the base layer is denoted by index 0 and enhancement layers are denoted by non-zero indices. In one example, the weights $w_i$ are determined by the ratio between the data rate of the video coded data belonging to the i-th video layer and the sum data rate of the plurality of video coded layers forming the video coded stream data. In such embodiments, the RAN may further assist a UE with or without enabled support of semantic error correction with the error concealment by dynamic out filtering of layers (e.g., upper enhancement layers), thus adaptively and temporarily reducing the video rendering quality, yet avoiding higher PER and subsequent playback buffering and visual block artifacts effects.

In other embodiments, whereby UEs do not require RAN assistance for enablement of video approximate semantic communications, a UE may singlehandedly monitor its received CBs/CBGs/TBs status across a predetermined statistical running window and map the latter statistics to a decision of whether or not subsequent retransmission of CBGs/TBs is required from the gNB. The latter UE mapping is based on a decision comparing the speculative error statistic determined post channel decoding at a level of BLER/LLR/NALuER and the knowledge of the semantic error correction capabilities of a smart video decoder at said UE.

As such, in some embodiments, a UE may control its own inner processing loop up to implementation specifics, simply signaling ACK/NACK HARQ feedback indications over UCI signaling, such that the video approximate semantic communications mode is supported transparently to any RAN instantiation. However, in most of the operating cases RAN awareness of the operations performed by a UE where RAN support may be needed (e.g., retransmissions of part or complete TB s, dynamic adaptation of retransmissions delay loop, dynamic adaption to wireless link fading of MCS etc.), and as such additional enhanced signaling from UE regarding the processing by semantic error correction in the video approximate semantic communications mode is desirable.

In addition to the semi-static UE capabilities information indications earlier described, in some embodiments, a dynamic signaling of the UE incurred post channel decoding processing within a unit of HARQ feedback can be signaled to inform the gNB on one hand of the CBs/CBGs/TB s received status, and on the other hand, to indicate supplemental information regarding at least one of a soft quality indicator of the latter transport blocks processing and ACK/NACK decision at the UE receiver, and an indicator of the application of semantic error correction to correct remaining errors post channel decoding for concealment of visual artifacts.

In a reduced signaling embodiment, two bits are to be utilized within the HARQ feedback indication to cover the PDSCH decoding decision, e.g., ACK/NACK, and respectively the video approximate semantic communications decision at the UE given its capabilities for semantic error correction. As such, a first bit per unit of HARQ feedback (e.g., CBs/CB Gs/TB s) is reserved for ACK/NACK indication, whereas a second bit per unit of HARQ feedback (e.g., CBs/CBGs/TBs) is reserved for additional information pertaining to the joint PDSCH decoding and application of semantic error correction determining the necessity of subsequent retransmissions for a TB or a segment thereof. For instance, in an embodiment, the second bit may be set depending on the value of the first bit as follows.

For a NACK indication of PDSCH decoding a second bit of '0' indicates a NACK that requires retransmission, e.g., even with SEC_ON the UE cannot visually recover the transmitted video coded data. On the other hand, for a NACK indication of PDSCH decoding a second bit of '1' indicates a NACK that does not require retransmission upon the enablement of the video approximate semantic communications mode as the UE determined that its capabilities of semantic error correction satisfy the empirical statistics collected to resolve the visual artifacts of the erroneous video data. However, for a disabled video approximate semantic communications mode a second bit indication of '1' indicates a NACK given PDSCH decoding whereas the confidence of the decision was low, e.g., the PDSCH decoding procedure implementation of the UE could not correct a TB or segment thereof under low confidence, given any soft decoding algorithm involved (e.g., LDPC LLR decoding).

given the instantaneous wireless channel and therefore within an implementation can be directly mapped to a dynamic indication of channel quality relative to the UE decoding ability, MCS and radio resource allocation selection.

As such, this information further aids as well the gNB inner loop and outer loop adaptation to meeting low BLER (e.g., within $[10^{-4}, 10^{-9})$) in fast fading wireless channels as soft information signaling within HARQ feedback may be necessary within 3GPP 5G NR for fast and dynamic adaption meeting ultra-reliable low-latency communications ("URLLC") requirements, e.g., see R1-2101460, CSI enhancement for IOT and URLLC, submitted by QUALCOMM to RAN1 Meeting #104-e Jan. 25th-Feb. 5th 2021; and R1-2100269, CSI Feedback Enhancements for IIoT/URLLC, submitted by ERICSSON to RAN1 Meeting #104-e Jan. $25^{th}$-Feb. $5^{th}$ 2021. Concretely, in an example, an ACK with LOW_CONFIDENCE, or a NACK with SEC_ON may trigger a reconfiguration of the MCS adaption at the gNB and/or increase the back-off retransmission timer in some implementations. As such, also given the fact that immersive AR/VR/XR applications may be categorized as mixed enhanced mobile broadband ("eMBB") and URLLC traffic, by the proposed signal both the novel video approximate semantic communications mode and the legacy bit-exact communications mode are simultaneously supported and/or enhanced. The 2-bit indication is summarized within Table 3 for both communication modes, e.g., legacy bit-exact and the proposed video approximate semantic communications.

TABLE 3

Example of a 2-bit realization encoding of a HARQ ACK-NACK feedback with soft information and support of video approximate semantic communications.

| Syntactic first bit encoding | Syntactic second bit encoding | Disabled video approximate semantic communication encoding | Enabled video approximate semantic communication encoding |
|---|---|---|---|
| 0 | 0 | (NACK, HIGH_CONF) NACK signaled with high confidence; very low SNR given configured MCS | (NACK, HIGH_CONF) NACK signaled with high confidence; very low SNR given configured MCS |
| 0 | 1 | (NACK, LOW_CONF) NACK signaled with low confidence; potential transient deep fade due to low SNR given configured MCS | (NACK, SEC_ON) An ACK by means of enabled semantic error correction - no need to retransmit |
| 1 | 0 | (ACK, LOW_CONF) ACK signaled with low confidence | (ACK, LOW_CONF) ACK signaled with low confidence |
| 1 | 1 | (ACK, HIGH_CONF) ACK signaled with high confidence | (ACK, HIGH_CONF) ACK signaled with high confidence |

For an ACK indication of PDSCH decoding a second bit of '0' indicates that the PDSCH decoding has passed albeit the confidence of the pass decision at UE receiver side was low, given any soft decoding algorithm involved for the channel FEC decoding (e.g., LDPC LLR decoding). Oppositely, a second bit of '1' indicates that the PDSCH decoding has passed and the confidence of the pass decision at the UE receiver side was high. This type of soft information associated with the ACK HARQ feedback is therefore a consequence of a UE mapping of its PDSCH decoding ability Extensions of the previous 2-bit signaling embodiment to multiple bit soft information width can easily be performed by one skilled in the art by abstractly following the description provided within the previous embodiments. To this extent, multiple bits (rather than one bit alone within the 2-bit discussed signaling) are reserved to provide finer granularity to the soft information accompanying the ACK/NACK HARQ indication. An example of this is portrayed in Table 4 for a 3-bit signaling scheme.

TABLE 4

Example of a 3-bit realization encoding of a HARQ ACK-NACK feedback with soft information and support of video approximate semantic communications.

| Syntactic 1st bit encoding | Syntactic 2nd bit encoding | Syntactic 3rd bit encoding | Disabled video approximate semantic communication encoding | Enabled video approximate semantic communication encoding |
|---|---|---|---|---|
| 0 | 0 | 0 | (NACK, HIGH_CONF) NACK signaled with high confidence; | (NACK, HIGH_CONF) NACK signaled with high confidence; |
| 0 | 0 | 1 | (NACK, MED_HIGH_CONF) NACK signaled with medium high confidence; | (NACK, MED_HIGH_CONF) NACK signaled with medium high confidence; |
| 0 | 1 | 0 | (NACK, MED_LOW_CONF) NACK signaled with medium low confidence; | (NACK, MED_LOW_CONF) NACK signaled with medium low confidence; |
| 0 | 1 | 1 | (NACK, LOW_CONF) NACK signaled with low confidence; | (NACK, SEC_ON) An ACK by means of enabled semantic error correction no need to retransmit |
| 1 | 0 | 0 | (ACK, LOW_CONF) ACK signaled with low confidence; | (ACK, LOW_CONF) ACK signaled with low confidence; |
| 1 | 0 | 1 | (ACK, MED_LOW_CONF) ACK signaled with medium low confidence; | (ACK, MED_LOW_CONF) ACK signaled with medium low confidence; |
| 1 | 1 | 0 | (ACK, MED_HIGH_CONF) ACK signaled with medium high confidence; | (ACK, MED_HIGH_CONF) ACK signaled with medium high confidence; |
| 1 | 1 | 1 | (ACK, HIGH_CONF) ACK signaled with high confidence; | (ACK, HIGH_CONF) ACK signaled with high confidence; |

In an example, a UE provides a set of HARQ-ACK with soft information in a first HARQ-ACK codebook, and a set of HARQ-ACK without soft information in a second HARQ-ACK codebook.

In another example, a timer starts after receiving an indication (either from UE or from gNB) of enabling semantic error correction and video approximate semantic communications mode for DL transmissions, and the UE starts transmitting HARQ-ACK with soft information until the timer expires or another indication of enabling/extending the semantic error correction and video approximate semantic communications mode for DL transmissions is received. The UE stops transmitting HARQ-ACK with soft information when the timer expires.

In an example, a UE receives an indication from the gNB indicating to enable semantic error correction and video approximate semantic communications mode for DL transmissions. In such an embodiment, the UE transmits HARQ-ACKs with soft information in response to DL transmission until the UE receives another indication to disable semantic error correction and video approximate semantic communications mode for DL transmissions. The UE may then transmit HARQ-ACK without soft information. The indication(s) can be provided to the UE via DCI scheduling DL transmissions.

In an example, the enabling/disabling semantic error correction and video approximate semantic communications mode for DL transmissions may be performed certain time after receiving an indication indicating the enabling/disabling. The UE provides HARQ-ACK with soft information after the application delay is elapsed from the time the enabling/disabling indication is received.

In one embodiment, a RAN implementation with support for video approximate semantic communications and semantic error correction may dynamically apply the latter to aid the UL video coded data communications with immersive, high-rate, low-latency characteristics specific to AR/XR/VR or advanced CGM applications. To this degree, a RAN implementation may support a UL realization of the video approximate semantic communications mode whereby at least the high-level procedures below are required in case errors are present post PUSCH FEC decoding:

- Determine whether delay budget allows for semantic error correction given the QoS flow associated with the DRB of the UL video coded traffic PDB requirements and knowledge of RAN processing delay, instantaneous RAN load, and/or CN expected delay;
- If delay budget allows to perform semantic error correction necessary steps for UL transmissions (e.g., at least video decoding, semantic error correction, and re-encoding with same video codec under the same input video codec configuration or a low-delay configuration variant thereof);
- Configure the UE retransmission resources and grants accordingly to semantic error correction dynamic capabilities; and
- Transmit further over the RAN upper layers the potentially semantic error corrected video coded data to the CN.

The procedure described in the above embodiment may require additional signaling to the UE for synchronization between the operations performed at the RAN and the expected communications feedback at the UE. Thus, in some embodiments, even though the steps detailed above are dependent on a RAN specific implementation in support of video approximate semantic communications, the associated system-level signaling mechanism, e.g., HARQ feedback and/or configuration of UE retransmissions resources, may require extension and enhanced signaling to support subject matter disclosed herein.

In embodiments where no errors post PUSCH decoding are encountered, or in embodiments where errors post PUSCH decoding are detected and the RAN does not have the necessary resources to satisfy the QoS flow or semantic error correction processing required constraints (e.g., not enough delay budget available for required processing, RAN load exceeds certain processing threshold etc.), the RAN signaling and associated procedures with respect to the UE UL traffic remain unchanged. As such, as in the UL HARQ feedback in 5G NR is asynchronous and implicit based on the DCI scheduling grants of UL traffic, for retransmissions DCI scheduling of UL PUSCH traffic configured with the HARQ process number of the original transmission and no new data indication (configured via the new data indicator ("NDI") bitfield) is utilized as an implicit HARQ-NACK. On the other hand, if NDI is configured for indication of new data an implicit HARQ-ACK signaling is assumed on the UE side.

Figure 8:
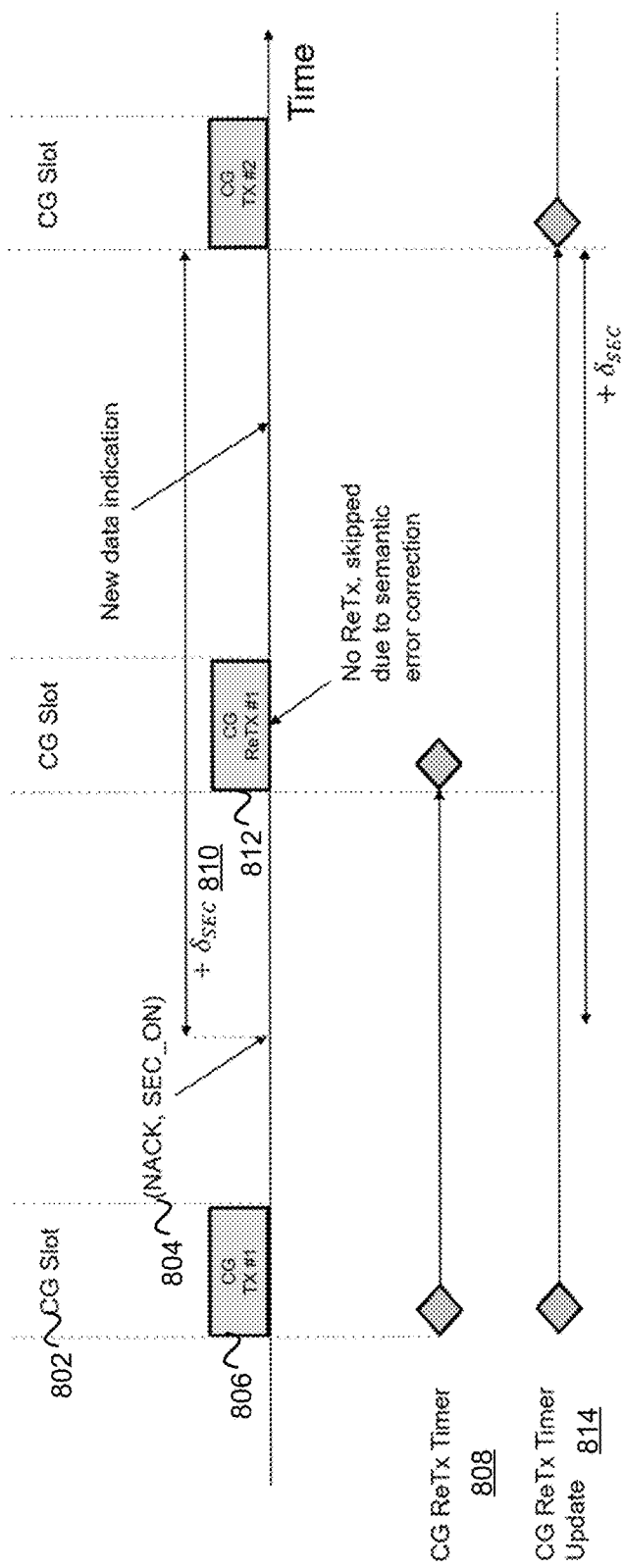
FIG. 8 depicts one example of a CG retransmission timer update of CG autonomous retransmissions by means of explicit HARQ signaling as (NACK, SEC_ON) from a gNB receiver with semantic error correction in UL enabled video approximate semantic communications.

However, as shown in FIG. 8, in some embodiments where errors post PUSCH decoding are found, and a gNB has enough resources for processing the defined UL semantic error correction steps from above an indication as part of a RAN-embedded signaling mechanism may signal the latter gNB decision to a UE to optimize the UE processing and operation costs. For instance, in case of a semi-statically RRC configured grant ("CG") 802, either semi-statically signaled/enabled as a Type I CG (by means of RRC signaling) or dynamically signaled, enabled/disabled as Type II CG (by means of DCI Format 0), the gNB can additionally signal to the UE an explicit HARQ feedback tuple (NACK, SEC_ON) 804 as a bit field of DCI associated with the HARQ process number of the PUSCH erroneous transmission 806. The tuple (NACK, SEC_ON) 804 shall explicitly indicate to the UE the fact that the gNB received the UL PUSCH video coded data with errors (e.g., as a NACK at syntactic level), but upon enablement of semantic error correction, a video approximate version of the original message can be recovered within the QoS flow requirements of the associated DRB within sufficiently low video distortion of semantic approximation compared to a given and/or known fixed threshold. Thus, the explicit HARQ signaling tuple (NACK, SEC_ON) 804 represents an implicit HARQ-ACK based on RAN-level support for the video approximate semantic communications that is intended to optimize energy and processing costs, as well as resource allocation, of a UE whereby autonomous retransmissions 812 may be configured and enabled by means of one or more CG configurations (either as Type-I or Type-II, respectively).

The tuple signaling implicit HARQ-ACK for video approximate semantic communications is meant in some embodiments to dynamically extend a UE's current CG retransmission timer 808 for the associated HARQ process number by a known fixed duration $\delta_{SEC}$ 810. In an embodiment, $\delta_{SEC}$ 810 is set up semi-statically by at least one of RRC configuration, and a MAC-CE configuration, to allow the RAN level semantic error correction processing to take place within its expected processing delay <$\delta_{SEC}$ 810. Upon successful completion of the semantic error correction procedure at the RAN-level, in some embodiments, the gNB can indicate to the UE to schedule new video coded data onto the next CG 802 by means of an explicit downlink HARQ-ACK feedback information at least in the form of one of a DCI Format 0 signaling NDI request for the current HARQ process number under the currently active CG configuration, a dynamic combination of a first DCI CG deactivation followed by a second DCI CG activation for Type-II CGI, a reset indication over DCI PDCCH signaling for the CG state and associated transmission and retransmission timers 808 for both Type-I and Type-II CG types.

This mechanism, in one embodiment, enables the gNB to control the UE operation and optimize its resource utilization with respect to energy usage, radio resource usage by the HARQ process handling video coded traffic data wherein semantic error correction and video approximate semantic communications modes are dynamically enabled at the RAN side. FIG. 8 illustrates the basic high-level signaling mechanisms involved between a gNB and a UE for such embodiments.

In some embodiments, the HARQ feedback tuple (NACK, SEC_ON) 804 can be delay-aware to additionally include a gNB specified dynamic value to extend the CG retransmission timer 808 of an associated HARQ process, e.g., an updated CG retransmission timer 814. In such an example the gNB may determine and optimize the duration $\delta_{SEC}$ 810 as $\delta_{SEC}^{gNB}$ to produce the enhanced delay-aware HARQ feedback tuple (NACK, SEC_ON, $\delta_{SEC}^{gNB}$) as a bitfield based on the RAN knowledge of scheduling upcoming grants, CG active configuration, processing load and delay of required semantic error correction procedures.

In an embodiment, a UE can be configured with at least two retransmission timers (e.g., cg-RetransmissionTimer (e.g., as defined in 3GPP Technical Specification TS 38.321 (V16.3.0—January 2021). 5G; NR; Medium Access Control (MAC) protocol specification (Release 16); and 3GPP Technical Specification TS 38.331 (V16.1.0—July 2020). 5G; NR; Radio Resource Control (RRC); Protocol specification (Release 16)) for UL transmissions in a configured grant:

A first retransmission timer is associated with/applied for UL transmissions that do not correspond to semantic error correction and video approximate semantic communications mode; and A second retransmission timer is associated with/applied for UL transmissions that correspond to semantic error correction and video approximate semantic communications mode.

In an example, a PUSCH transmission on a CG resource can include an indication to the network indicating that whether the PUSCH transmission is a transmission for which gNB may apply semantic error correction and video approximate semantic communications mode or whether the PUSCH transmission is a video transmission. The UE may start the second timer after an UL transmission that is indicated for which gNB may apply semantic error correction and video approximate semantic communications mode on a CG resource.

In an embodiment, a UE, for a configured grant configuration (e.g., ConfiguredGrantConfig, (e.g., as defined in 3GPP Technical Specification TS 38.331 (V16.1.0—July 2020). 5G; NR; Radio Resource Control (RRC); Protocol specification (Release 16)), can be configured with a first cg-minDFI-Delay and a second cg-minDFI-Delay, wherein the first cg-minDFI-Delay is applicable to PUSCH transmissions for which gNB may apply semantic error correction and video approximate semantic communications mode, and wherein the second cg-minDFI-Delay is applicable to PUSCH transmissions for which semantic error correction and video approximate semantic communications mode are not applicable at gNB.

The above two embodiments may be needed in case the gNB dynamically (e.g., by MAC-CE or DCI or via a timer) can enable/disable semantic error correction and video approximate semantic communications mode for UL transmissions (e.g., UL transmissions associated with a particular configured grant configurations). One reason of such dynamic enabling/disabling could be the dynamic nature of processing/traffic load at gNB. In an implementation, a UE might be configured with multiple configured grant configurations, and semantic error correction and video approximate semantic communications mode for UL transmissions can be enabled/disabled semi-statically per configured grant configuration. In an implementation, semantic error correction and video approximate semantic communications mode for UL transmissions can be supported for a subset of configured grant configurations with existing specifications (e.g., of Rel-17 3GPP specifications).

Figure 9:
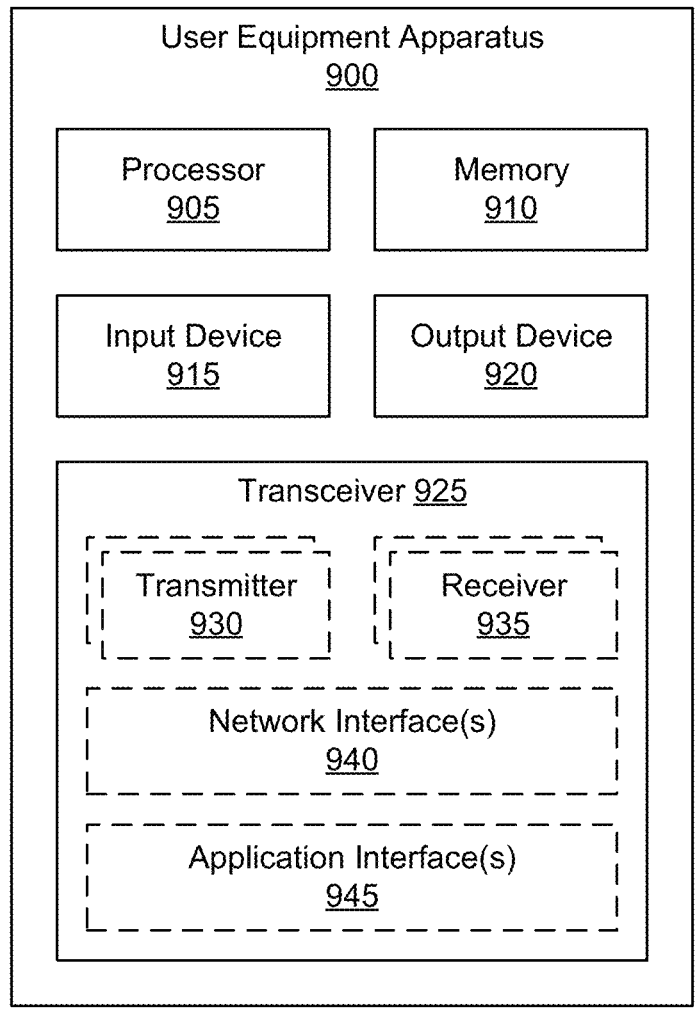
FIG. 9 is a block diagram illustrating one embodiment of a user equipment apparatus that may be used for radio access network configuration for video approximate semantic communications.

FIG. 9 depicts a user equipment apparatus 900 that may be used for radio access network configuration for video approximate semantic communications, according to embodiments of the disclosure. In various embodiments, the user equipment apparatus 900 is used to implement one or more of the solutions described above. The user equipment apparatus 900 may be one embodiment of the remote unit 105 and/or the UE, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panel supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio functions.

In various embodiments, the processor 905 and transceiver 925 control the user equipment apparatus 900 to implement the above described UE behaviors. In one embodiment, the transceiver 925 receives from a transmitter a bitstream corresponding to a video coded data transmission wherein the received bitstream includes bitwise transmission errors. In one embodiment, the processor 905 that performs forward error correction ("FEC") decoding and correcting at least one bitwise transmission error of the video coded data transmission whereas at least one bitwise transmission error is left in a bit-inexact reception of the video coded data transmissions post FEC decoding.

In one embodiment, the processor 905 applies, by a smart video decoder in a video approximate semantic communications mode, semantic error correction to decoded video coded data transmissions to correct and conceal one or more video artifacts in response to the bit-inexact reception of the video coded data transmissions post FEC decoding. In one embodiment, the processor 905 reconstructs a video uncoded representation of concealed approximate semantic content relative to the received bitstream corresponding to the video coded data transmission.

In one embodiment, the smart video decoder is comprised of a first functionality that decodes the video coded data transmissions according to a fixed knowledge base of a video codec specification and a second functionality that provides the semantic error correction by processing the video decoded information to correct and conceal the one or more video artifacts due to the bit-inexact reception of the video coded data transmissions.

In one embodiment, the video decoding and semantic error correction functionality of the smart video decoder is comprised of one of a video decoder of the video codec specification, a collection of statistical joint spatio-temporal video frame information and a usage of the spatio-temporal video frame information as a first statistical prior semantic model together with a second statistical model for semantic error correction and a joint optimization of said video decoding and semantic error correction functionality as a unique statistical neural model given a fixed knowledge base of the video codec specification.

In one embodiment, the transceiver 925 signals to a transmitter a set of smart video decoder capabilities and features in support of the video approximate semantic communications mode, the signal comprising at least one selected from the group of an enablement flag as a one-bit indicator describing the enablement state of the semantic error correction functionality for the video approximate semantic communications, a maximum error rate threshold for the amount of transmission errors the semantic error correction functionality can tolerate to achieve a fixed video reconstruction quality, a statistical running window configuration over which a transmission error rate statistic is monitored and compared with the maximum error rate threshold tolerated by the semantic error correction, a maximum processing delay, wherein the maximum processing delay can be further split into a video decoding processing delay and a video semantic error correction processing delay, an estimated average energy consumption indicator comprising of a first estimate of average energy consumption with semantic error correction enabled and a second estimate of average energy consumption with semantic error correction disabled, a power supply indicator determining the power source type, an indication determining the maximum video frame mobility and video frame change rate that the semantic error correction can process to achieve a fixed video reconstruction quality, a standalone operation flag as a one-bit indicator describing the receiver capability to perform semantic error correction monitoring and enabling or disabling of the semantic error correction with assistance from the transmitter or without assistance from the transmitter.

In one embodiment, the set of capabilities of the receiver to support the video approximate semantic communications mode is indicated by at least one of selected from the group of semi-static Radio Resource Control ("RRC") message signaling, dynamic Uplink Control Information ("UCI") bit field signaling, dynamic UCI scheduling request signaling, and user equipment ("UE")/device capability reporting signaling.

In one embodiment, the processor 905 reports the maximum error rate threshold for transmission errors tolerated by the semantic error correction and the associated statistical running window configuration for monitoring thereof wherein the maximum error rate threshold is expressed by at least one selected from the group of a transmission block error rate ("BLER") corresponding to a configured granularity of transmission blocks, a log-likelihood ratio ("LLR") average statistic of transmission blocks post FEC decoding, and a video coded Network Abstraction Layer ("NAL") unit error rate ("NALuER") average statistic whereby video coded traffic-aware communications is configured.

In one embodiment, the processor 905 performs one of dynamically enabling and dynamically disabling capabilities of the video approximate semantic communications mode based on the enablement flag indicator of semantic error correction functionality wherein the enablement flag indicator status is modified by at least one of a transmitter by indication of at least one selected from the group of downlink control information ("DCI") bit field message signaling, a DCI signaling for a data communication over a Physical Downlink Shared Channel ("PDSCH"), and Medium Access Control-Control Element ("MAC-CE") bit field message signaling, and the receiver by indication of at least one selected from the group of a UCI bit field message signaling, a UCI signaling for a data communication over a Physical Uplink Shared Channel ("PUSCH"), and MAC-CE bit field message signaling.

In one embodiment, one of the dynamic enabling and dynamic disabling of the video approximate semantic communications mode is transiently determined spanning a fixed duration of a countdown timer over which the semantic error correction is enabled or disabled.

In one embodiment, an energy-aware receiver signals to the transmitter one of dynamic enabling and dynamic disabling of the semantic error correction capability given at least one of a critical battery energy threshold such that the semantic error correction capability is at least partially disabled in response to the battery energy level dropping below the critical battery energy threshold and the semantic error correction capability is enabled in response to the battery energy level satisfying the critical battery energy threshold wherein a reason for a dynamic change in the enablement status of the semantic error correction capability is jointly reported with an associated enablement and/or disablement command, and a power supply status change such that a disablement indication is signaled in response to a battery energy flow powering the receiver and an enablement indication is signaled in response to an external energy source flow powering the receiver wherein a reason for a dynamic change in the enablement status of the semantic error correction capability is jointly reported with an associated enablement and/or disablement command.

In one embodiment, the transceiver 925 receives additional assistance in controlling the video approximate semantic communications mode and error concealment from the transmitter by means of at least one selected from the group of a delay-aware predictive scheduling of one or more on-demand video keyframes on behalf of the receiver to conceal and prevent video errors propagation, a multi-layered video coded traffic-aware opportunistic dropping of at least one video coded layer information to prevent video errors, and a monitoring and determining of a transmissions error statistic and enabling or disabling of the semantic error correction within a configured statistical running window wherein the transceiver 925 processes a hybrid automatic repeat request ("HARQ") process and provides a HARQ acknowledgement ("HARQ-ACK") or HARQ non-acknowledgement ("HARQ-NACK") feedback to the transmitter thereof.

In one embodiment, in response to the determined transmissions error statistic being less than a configured receiver capability of the maximum error rate threshold, no retransmissions are necessary to be received by the transceiver wherein the transceiver receives dynamic indication to perform semantic error correction from the transmitter by at least one selected from the group of a bit field indication within Demodulation Reference Signal ("DM-RS") embedded in the originally transmitted transmission blocks within a PDSCH, a dedicated DCI bit field signaling over a Physical Downlink Control Channel ("PDCCH"), and a MAC-CE indication.

In one embodiment, in response to the determined transmissions error statistic being equal to or greater than a configured receiver capability of the maximum error rate threshold, retransmissions are necessary to be received by the transceiver to aid the transceiver in one of lowering the transmissions error statistic below the receiver capability of the maximum error rate threshold for transmission errors that the semantic error correction functionality can tolerate to achieve a fixed video reconstruction quality and eliminating the transmissions errors post FEC decoding.

In one embodiment, the transceiver provides to the transmitter a unit of HARQ feedback information, wherein the HARQ feedback information is comprised of an information tuple represented as a bit field wherein a first component is a HARQ acknowledgment ("ACK")/non-acknowledgement ("NACK") bit determined by completion of FEC decoding of a unit of a transmission block, and a second component represents a bit encoding of a confidence level describing the first component determination.

In one embodiment, the apparatus 900 independently controls the video approximate semantic communications mode by monitoring and determining a transmissions error statistic that triggers the semantic error correction enabling and/or disabling within its configured statistical running window and signaling appropriate units of HARQ feedback to the transmitter given the internal operation mode of the semantic error correction.

In one embodiment, the transceiver provides to the transmitter a unit of HARQ feedback information, wherein the HARQ feedback information is comprised of an information tuple represented as a bit field wherein a first component is a HARQ acknowledgment ("ACK")/non-acknowledgement ("NACK") bit determined by completion of FEC decoding of a unit of a transmission block, and a second component represents a bit encoding of a confidence level describing the first component determination.

In one embodiment, the processor 905 quantizes the second component of a unit of HARQ feedback information to a discrete number of confidence levels such that a first HARQ feedback component as a NACK coupled with a second HARQ feedback component as a lowest confidence level represents a transmission wherein the remaining uncoded video artifacts of the bit-inexact transmission are semantically correctable and concealable by the enabled receiver semantic error correction processing.

In one embodiment, the apparatus 900 is part of a Radio Access Network ("RAN") as one of a plurality of transmission-reception points wherein the apparatus 900 and/or the enclosing RAN supports the video approximate semantic communications mode for semantic error correction.

In one embodiment, the apparatus 900 signals an explicit unit of HARQ-NACK feedback formed of a tuple of two components as a bit field, a first component corresponding to an associated NACK indication and a second component corresponding to an indication of the active status of the video approximate semantic communications mode whereby the unit of HARQ-NACK feedback signals to a transmitter the extension of a retransmission timer of configured grants ("CGs") to allow for the semantic error correction processing delay of the receiver by one of a fixed delay duration $\delta_{SEC}$ and a dynamic delay duration $\delta_{SEC}^{gNB}$ determined based on the receiver knowledge of processing semantic error correction delay and the time span to the next available configured grant occasion, whereby the determined $\delta_{SEC}^{gNB}$ extends the HARQ-NACK feedback tuple bit field as a third component.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to radio access network configuration for video approximate semantic communications. For example, the memory 910 may store various parameters, panel/beam configurations, resource assignments, policies, and the like as described above. In certain embodiments, the memory 910 also stores program code and related data, such as an operating system or other controller algorithms operating on the user equipment apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an application-specific integrated circuit ("ASIC"), or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
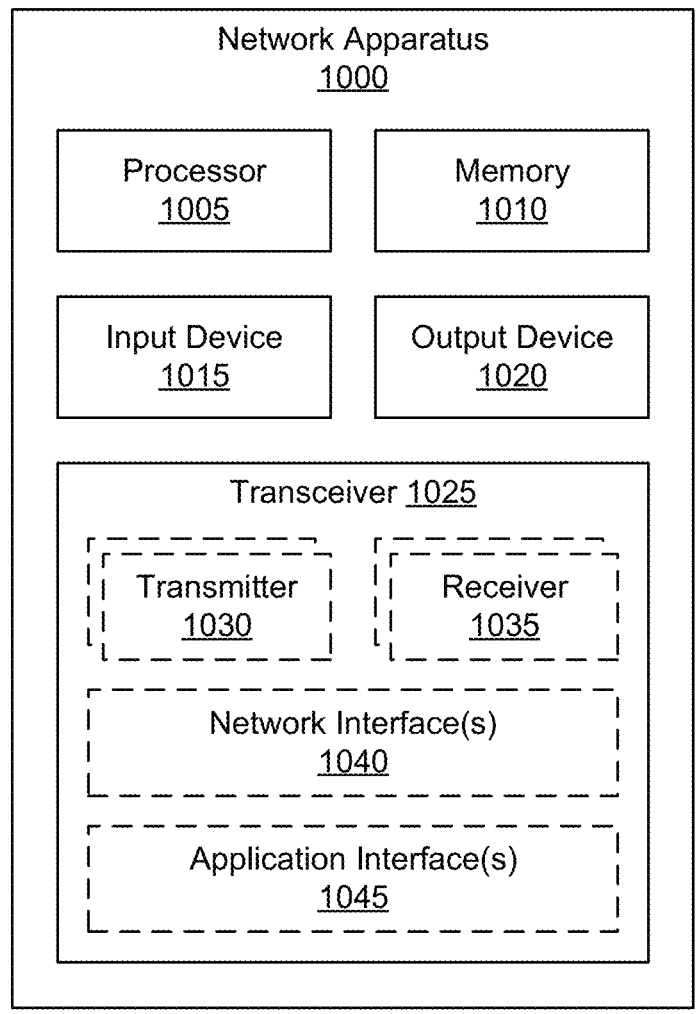
FIG. 10 is a block diagram illustrating one embodiment of a network apparatus that may be used for radio access network configuration for video approximate semantic communications.

FIG. 10 depicts a network apparatus 1000 that may be used for radio access network configuration for video approximate semantic communications, according to embodiments of the disclosure. In one embodiment, network apparatus 1000 may be one implementation of a RAN node, such as the base unit 121, the RAN node 210, or gNB, described above. Furthermore, the base network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025. In certain embodiments, the processor 1005 may include an application processor (also known as "main processor") which manages application-domain and operating system ("OS") functions and a baseband processor (also known as "baseband radio processor") which manages radio function.

The memory 1010, in one embodiment, is a computer readable storage medium. In some embodiments, the memory 1010 includes volatile computer storage media. For example, the memory 1010 may include a RAM, including DRAM, SDRAM, and/or SRAM. In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non volatile computer storage media.

In some embodiments, the memory 1010 stores data related to radio access network configuration for video approximate semantic communications. For example, the memory 1010 may store parameters, configurations, resource assignments, policies, and the like, as described above. In certain embodiments, the memory 1010 also stores program code and related data, such as an operating system or other controller algorithms operating on the network apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all, or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the non-public network ("NPN"), PLMN and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

In one embodiment, the transceiver 1025 receives an indication of video approximate semantic communications mode of a receiver and a configuration thereof and transmits a plurality of video coded data transmissions. In one embodiment, the processor 1005 uses the configuration of video approximate semantic communications mode of the receiver to process HARQ feedback monitoring and to signal for enablement/disablement of semantic error correction at the receiver.

Figure 11:
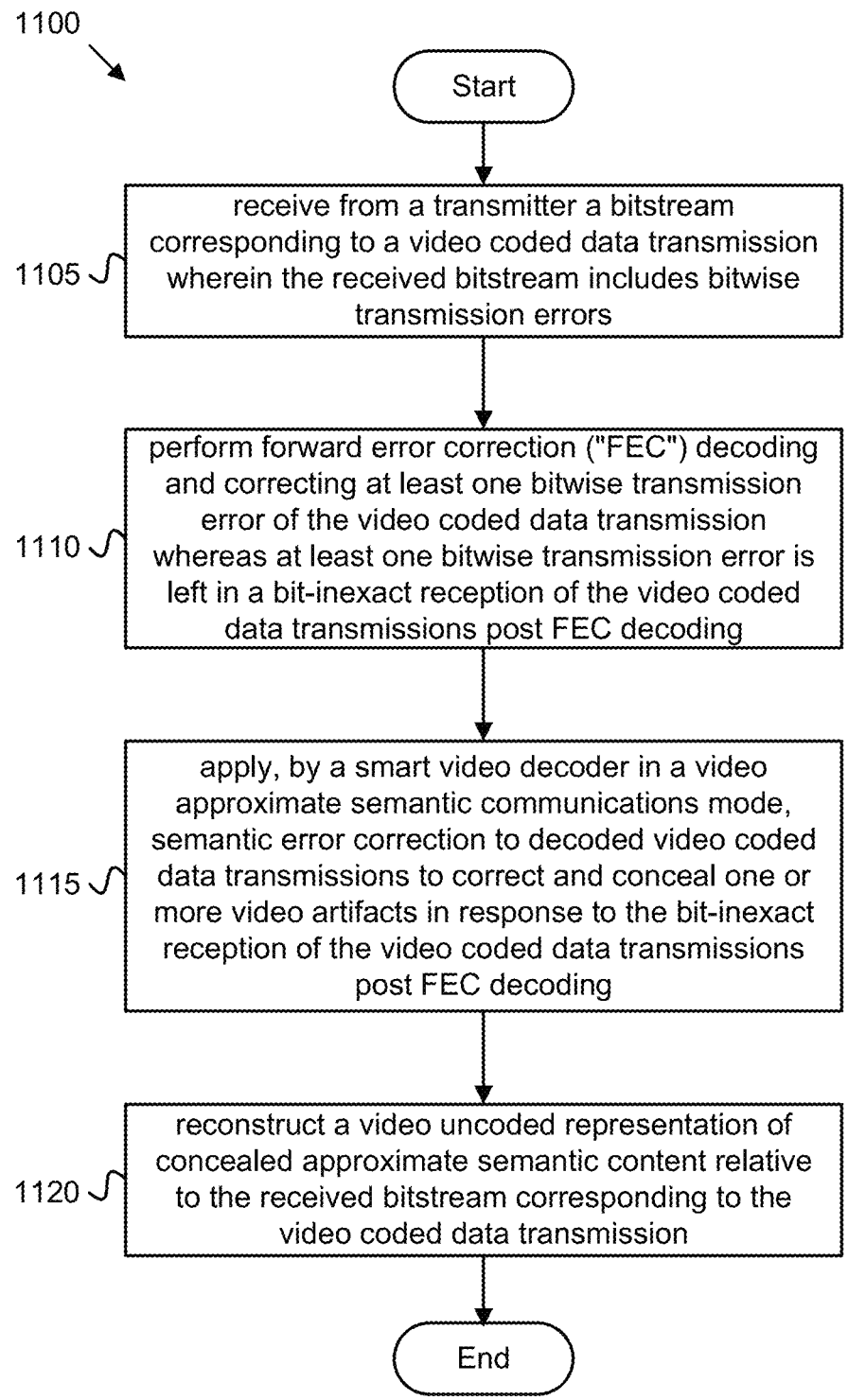
FIG. 11 is a flowchart diagram illustrating one embodiment of a method for radio access network configuration for video approximate semantic communications.

FIG. 11 is a flowchart diagram of a method 1100 for radio access network configuration for video approximate semantic communications. The method 1100 may be performed by a network entity such as a base node, a gNB, and/or the network equipment apparatus 1000 or by a remote unit 105 such as a UE or a user equipment apparatus 900. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes receiving 1105 from a transmitter a bitstream corresponding to a video coded data transmission wherein the received bitstream includes bitwise transmission errors. In one embodiment, the method 1100 includes performing 1110 forward error correction ("FEC") decoding and correcting at least one bitwise transmission error of the video coded data transmission whereas at least one bitwise transmission error is left in a bit-inexact reception of the video coded data transmissions post FEC decoding.

In one embodiment, the method 1100 includes applying 1115, by a smart video decoder in a video approximate semantic communications mode, semantic error correction to decoded video coded data transmissions to correct and conceal one or more video artifacts in response to the bit-inexact reception of the video coded data transmissions post FEC decoding. In one embodiment, the method 1100 includes reconstructing 1120 a video uncoded representation of concealed approximate semantic content relative to the received bitstream corresponding to the video coded data transmission, and the method 1100 ends.

Figure 12:
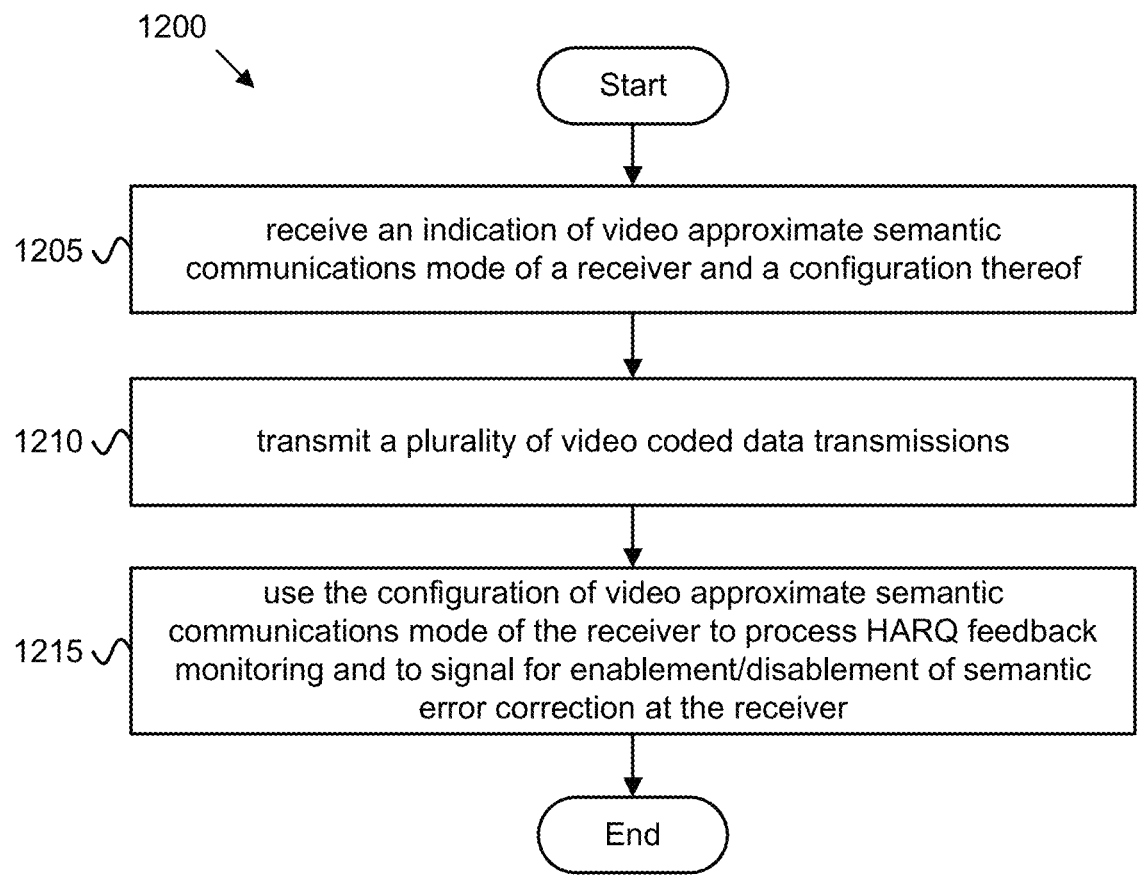
FIG. 12 is a flowchart diagram illustrating one embodiment of another method for radio access network configuration for video approximate semantic communications.

FIG. 12 is a flowchart diagram of a method 1200 for radio access network configuration for video approximate semantic communications. The method 1200 may be performed by a network entity such as a base node, a gNB, and/or the network equipment apparatus 1000 or by a remote unit 105 such as a UE or a user equipment apparatus 900. In some embodiments, the method 1200 may be performed by a processor executing program code, for example, a microcontroller, a microprocessor, a CPU, a GPU, an auxiliary processing unit, a FPGA, or the like.

In one embodiment, the method 1200 includes receiving 1205 an indication of video approximate semantic communications mode of a receiver and a configuration thereof. In one embodiment, the method 1200 includes transmitting 1210 a plurality of video coded data transmissions. In one embodiment, the method 1200 includes using 1215 the configuration of video approximate semantic communications mode of the receiver to process HARQ feedback monitoring and to signal for enablement/disablement of semantic error correction at the receiver, and the method 1200 ends.

A first apparatus is disclosed for radio access network configuration for video approximate semantic communications. The first apparatus may include a network entity such as a base node, a gNB, and/or the network equipment apparatus 1000 or a remote unit 105 such as a UE or a user equipment apparatus 900. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver that receives from a transmitter a bitstream corresponding to a video coded data transmission wherein the received bitstream includes video artifacts due to bitwise transmission errors. In one embodiment, the first apparatus includes a processor that performs forward error correction ("FEC") decoding and correcting at least one bitwise transmission error of the video coded data transmission whereas at least one bitwise transmission error is left in a bit-inexact reception of the video coded data transmissions post FEC decoding.

In one embodiment, the processor applies, by a smart video decoder in a video approximate semantic communications mode, semantic error correction to decoded video coded data transmissions to correct and conceal one or more video artifacts in response to the bit-inexact reception of the video coded data transmissions post FEC decoding. In one embodiment, the processor reconstructs a video uncoded representation of concealed approximate semantic content relative to the received bitstream corresponding to the video coded data transmission.

In one embodiment, the smart video decoder is comprised of a first functionality that decodes the video coded data transmissions according to a fixed knowledge base of a video codec specification and a second functionality that provides the semantic error correction by processing the video decoded information to correct and conceal the one or more video artifacts due to the bit-inexact reception of the video coded data transmissions.

In one embodiment, the video decoding and semantic error correction functionality of the smart video decoder is comprised of one of a video decoder of the video codec specification, a collection of statistical joint spatio-temporal video frame information and a usage of the spatio-temporal video frame information as a first statistical prior semantic model together with a second statistical model for semantic error correction and a joint optimization of said video decoding and semantic error correction functionality as a unique statistical neural model given a fixed knowledge base of the video codec specification.

In one embodiment, the transceiver signals to a transmitter a set of smart video decoder capabilities and features in support of the video approximate semantic communications mode, the signal comprising at least one selected from the group of an enablement flag as a one-bit indicator describing the enablement state of the semantic error correction functionality for the video approximate semantic communications, a maximum error rate threshold for the amount of transmission errors the semantic error correction functionality can tolerate to achieve a fixed video reconstruction quality, a statistical running window configuration over which a transmission error rate statistic is monitored and compared with the maximum error rate threshold tolerated by the semantic error correction, a maximum processing delay, wherein the maximum processing delay can be further split into a video decoding processing delay and a video semantic error correction processing delay, an estimated average energy consumption indicator comprising of a first estimate of average energy consumption with semantic error correction enabled and a second estimate of average energy consumption with semantic error correction disabled, a power supply indicator determining the power source type, an indication determining the maximum video frame mobility and video frame change rate that the semantic error correction can process to achieve a fixed video reconstruction quality, a standalone operation flag as a one-bit indicator describing the receiver capability to perform semantic error correction monitoring and enabling or disabling of the semantic error correction with assistance from the transmitter or without assistance from the transmitter.

In one embodiment, the set of capabilities of the receiver to support the video approximate semantic communications mode is indicated by at least one of selected from the group of semi-static Radio Resource Control ("RRC") message signaling, dynamic Uplink Control Information ("UCI") bit field signaling, dynamic UCI scheduling request signaling, and user equipment ("UE")/device capability reporting signaling.

In one embodiment, the processor reports the maximum error rate threshold for transmission errors tolerated by the semantic error correction and the associated statistical running window configuration for monitoring thereof wherein the maximum error rate threshold is expressed by at least one selected from the group of a transmission block error rate ("BLER") corresponding to a configured granularity of transmission blocks, a log-likelihood ratio ("LLR") average statistic of transmission blocks post FEC decoding, and a video coded Network Abstraction Layer ("NAL") unit error rate ("NALuER") average statistic whereby video coded traffic-aware communications is configured.

In one embodiment, the processor performs one of dynamically enabling and dynamically disabling capabilities of the video approximate semantic communications mode based on the enablement flag indicator of semantic error correction functionality wherein the enablement flag indicator status is modified by at least one of a transmitter by indication of at least one selected from the group of downlink control information ("DCI") bit field message signaling, a DCI signaling for a data communication over a Physical Downlink Shared Channel ("PDSCH"), and Medium Access Control-Control Element ("MAC-CE") bit field message signaling, and the receiver by indication of at least one selected from the group of a UCI bit field message signaling, a UCI signaling for a data communication over a Physical Uplink Shared Channel ("PUSCH"), and MAC-CE bit field message signaling.

In one embodiment, one of the dynamic enabling and dynamic disabling of the video approximate semantic communications mode is transiently determined spanning a fixed duration of a countdown timer over which the semantic error correction is enabled or disabled.

In one embodiment, an energy-aware receiver signals to the transmitter one of dynamic enabling and dynamic disabling of the semantic error correction capability given at least one of a critical battery energy threshold such that the semantic error correction capability is at least partially disabled in response to the battery energy level dropping below the critical battery energy threshold and the semantic error correction capability is enabled in response to the battery energy level satisfying the critical battery energy threshold wherein a reason for a dynamic change in the enablement status of the semantic error correction capability is jointly reported with an associated enablement and/or disablement command, and a power supply status change such that a disablement indication is signaled in response to a battery energy flow powering the receiver and an enablement indication is signaled in response to an external energy source flow powering the receiver wherein a reason for a dynamic change in the enablement status of the semantic error correction capability is jointly reported with an associated enablement and/or disablement command.

In one embodiment, the transceiver receives additional assistance in controlling the video approximate semantic communications mode and error concealment from the transmitter by means of at least one selected from the group of a delay-aware predictive scheduling of one or more on-demand video keyframes on behalf of the receiver to conceal and prevent video errors propagation, a multi-layered video coded traffic-aware opportunistic dropping of at least one video coded layer information to prevent video errors, and a monitoring and determining of a transmissions error statistic and enabling or disabling of the semantic error correction within a configured statistical running window wherein the transceiver processes a hybrid automatic repeat request ("HARQ") process and provides a HARQ acknowledgement ("HARQ-ACK") or HARQ non-acknowledgement ("HARQ-NACK") feedback to the transmitter thereof.

In one embodiment, in response to the determined transmissions error statistic being less than a configured receiver capability of the maximum error rate threshold, no retransmissions are necessary to be received by the transceiver wherein the transceiver receives dynamic indication to perform semantic error correction from the transmitter by at least one selected from the group of a bit field indication within Demodulation Reference Signal ("DM-RS") embedded in the originally transmitted transmission blocks within a PDSCH, a dedicated DCI bit field signaling over a Physical Downlink Control Channel ("PDCCH"), and a MAC-CE indication.

In one embodiment, in response to the determined transmissions error statistic being equal to or greater than a configured receiver capability of the maximum error rate threshold, retransmissions are necessary to be received by the transceiver to aid the transceiver in one of lowering the transmissions error statistic below the receiver capability of the maximum error rate threshold for transmission errors that the semantic error correction functionality can tolerate to achieve a fixed video reconstruction quality and eliminating the transmissions errors post FEC decoding.

In one embodiment, the transceiver provides to the transmitter a unit of HARQ feedback information, wherein the HARQ feedback information is comprised of an information tuple represented as a bit field wherein a first component is a HARQ acknowledgment ("ACK")/non-acknowledgement ("NACK") bit determined by completion of FEC decoding of a unit of a transmission block, and a second component represents a bit encoding of a confidence level describing the first component determination.

In one embodiment, the apparatus independently controls the video approximate semantic communications mode by monitoring and determining a transmissions error statistic that triggers the semantic error correction enabling and/or disabling within its configured statistical running window and signaling appropriate units of HARQ feedback to the transmitter given the internal operation mode of the semantic error correction.

In one embodiment, the transceiver provides to the transmitter a unit of HARQ feedback information, wherein the HARQ feedback information is comprised of an information tuple represented as a bit field wherein a first component is a HARQ acknowledgment ("ACK")/non-acknowledgement ("NACK") bit determined by completion of FEC decoding of a unit of a transmission block, and a second component represents a bit encoding of a confidence level describing the first component determination.

In one embodiment, the processor quantizes the second component of a unit of HARQ feedback information to a discrete number of confidence levels such that a first HARQ feedback component as a NACK coupled with a second HARQ feedback component as a lowest confidence level represents a transmission wherein the remaining uncoded video artifacts of the bit-inexact transmission are semantically correctable and concealable by the enabled receiver semantic error correction processing.

In one embodiment, the apparatus is part of a Radio Access Network ("RAN") as one of a plurality of transmission-reception points wherein the apparatus and/or the enclosing RAN supports the video approximate semantic communications mode for semantic error correction.

In one embodiment, the apparatus signals an explicit unit of HARQ-NACK feedback formed of a tuple of two components as a bit field, a first component corresponding to an associated NACK indication and a second component corresponding to an indication of the active status of the video approximate semantic communications mode whereby the unit of HARQ-NACK feedback signals to a transmitter the extension of a retransmission timer of configured grants ("CGs") to allow for the semantic error correction processing delay of the receiver by one of a fixed delay duration $\delta_{SEC}$ and a dynamic delay duration $\delta_{SEC}^{gNB}$ determined based on the receiver knowledge of processing semantic error correction delay and the time span to the next available configured grant occasion, whereby the determined $\delta_{SEC}^{gNB}$ extends the HARQ-NACK feedback tuple bit field as a third component.

A first method is disclosed for radio access network configuration for video approximate semantic communications. The first method may be performed by a network entity such as a base node, a gNB, and/or the network equipment apparatus 1000 or by a remote unit 105 such as a UE or a user equipment apparatus 900. In some embodiments, the first method may be performed by a processor executing program code, for example, a microcontroller, a microprocessor, a CPU, a GPU, an auxiliary processing unit, a FPGA, or the like.

In one embodiment, the first method includes receiving from a transmitter a bitstream corresponding to a video coded data transmission wherein the received bitstream includes bitwise transmission errors. In one embodiment, the first method includes performing forward error correction ("FEC") decoding and correcting at least one bitwise transmission error of the video coded data transmission whereas at least one bitwise transmission error is left in a bit-inexact reception of the video coded data transmissions post FEC decoding.

In one embodiment, the first method includes applying, by a smart video decoder in a video approximate semantic communications mode, semantic error correction to decoded video coded data transmissions to correct and conceal one or more video artifacts in response to the bit-inexact reception of the video coded data transmissions post FEC decoding. In one embodiment, the first method includes reconstructing a video uncoded representation of concealed approximate semantic content relative to the received bitstream corresponding to the video coded data transmission.

In one embodiment, the smart video decoder is comprised of a first functionality that decodes the video coded data transmissions according to a fixed knowledge base of a video codec specification and a second functionality that provides the semantic error correction by processing the video decoded information to correct and conceal the one or more video artifacts due to the bit-inexact reception of the video coded data transmissions.

In one embodiment, the video decoding and semantic error correction functionality of the smart video decoder is comprised of one of a video decoder of the video codec specification, a collection of statistical joint spatio-temporal video frame information and a usage of the spatio-temporal video frame information as a first statistical prior semantic model together with a second statistical model for semantic error correction and a joint optimization of said video decoding and semantic error correction functionality as a unique statistical neural model given a fixed knowledge base of the video codec specification.

In one embodiment, the first method includes signaling to a transmitter a set of smart video decoder capabilities and features in support of the video approximate semantic communications mode, the signal comprising at least one selected from the group of an enablement flag as a one-bit indicator describing the enablement state of the semantic error correction functionality for the video approximate semantic communications, a maximum error rate threshold for the amount of transmission errors the semantic error correction functionality can tolerate to achieve a fixed video reconstruction quality, a statistical running window configuration over which a transmission error rate statistic is monitored and compared with the maximum error rate threshold tolerated by the semantic error correction, a maximum processing delay, wherein the maximum processing delay can be further split into a video decoding processing delay and a video semantic error correction processing delay, an estimated average energy consumption indicator comprising of a first estimate of average energy consumption with semantic error correction enabled and a second estimate of average energy consumption with semantic error correction disabled, a power supply indicator determining the power source type, an indication determining the maximum video frame mobility and video frame change rate that the semantic error correction can process to achieve a fixed video reconstruction quality, a standalone operation flag as a one-bit indicator describing the receiver capability to perform semantic error correction monitoring and enabling or disabling of the semantic error correction with assistance from the transmitter or without assistance from the transmitter.

In one embodiment, the set of capabilities of the receiver to support the video approximate semantic communications mode is indicated by at least one of selected from the group of semi-static Radio Resource Control ("RRC") message signaling, dynamic Uplink Control Information ("UCI") bit field signaling, dynamic UCI scheduling request signaling, and user equipment ("UE")/device capability reporting signaling.

In one embodiment, the first method includes reporting the maximum error rate threshold for transmission errors tolerated by the semantic error correction and the associated statistical running window configuration for monitoring thereof wherein the maximum error rate threshold is expressed by at least one selected from the group of a transmission block error rate ("BLER") corresponding to a configured granularity of transmission blocks, a log-likelihood ratio ("LLR") average statistic of transmission blocks post FEC decoding, and a video coded Network Abstraction Layer ("NAL") unit error rate ("NALuER") average statistic whereby video coded traffic-aware communications is configured.

In one embodiment, the first method includes performing one of dynamically enabling and dynamically disabling capabilities of the video approximate semantic communications mode based on the enablement flag indicator of semantic error correction functionality wherein the enablement flag indicator status is modified by at least one of a transmitter by indication of at least one selected from the group of downlink control information ("DCI") bit field message signaling, a DCI signaling for a data communication over a Physical Downlink Shared Channel ("PDSCH"), and Medium Access Control-Control Element ("MAC-CE") bit field message signaling, and the receiver by indication of at least one selected from the group of a UCI bit field message signaling, a UCI signaling for a data communication over a Physical Uplink Shared Channel ("PUSCH"), and MAC-CE bit field message signaling.

In one embodiment, one of the dynamic enabling and dynamic disabling of the video approximate semantic communications mode is transiently determined spanning a fixed duration of a countdown timer over which the semantic error correction is enabled or disabled.

In one embodiment, an energy-aware receiver signals to the transmitter one of dynamic enabling and dynamic disabling of the semantic error correction capability given at least one of a critical battery energy threshold such that the semantic error correction capability is at least partially disabled in response to the battery energy level dropping below the critical battery energy threshold and the semantic error correction capability is enabled in response to the battery energy level satisfying the critical battery energy threshold wherein a reason for a dynamic change in the enablement status of the semantic error correction capability is jointly reported with an associated enablement and/or disablement command, and a power supply status change such that a disablement indication is signaled in response to a battery energy flow powering the receiver and an enablement indication is signaled in response to an external energy source flow powering the receiver wherein a reason for a dynamic change in the enablement status of the semantic error correction capability is jointly reported with an associated enablement and/or disablement command.

In one embodiment, the first method includes receiving additional assistance in controlling the video approximate semantic communications mode and error concealment from the transmitter by means of at least one selected from the group of a delay-aware predictive scheduling of one or more on-demand video keyframes on behalf of the receiver to conceal and prevent video errors propagation, a multi-layered video coded traffic-aware opportunistic dropping of at least one video coded layer information to prevent video errors, and a monitoring and determining of a transmissions error statistic and enabling or disabling of the semantic error correction within a configured statistical running window wherein the transceiver processes a hybrid automatic repeat request ("HARQ") process and provides a HARQ acknowledgement ("HARQ-ACK") or HARQ non-acknowledgement ("HARQ-NACK") feedback to the transmitter thereof.

In one embodiment, in response to the determined transmissions error statistic being less than a configured receiver capability of the maximum error rate threshold, no retransmissions are necessary to be received by the transceiver wherein the transceiver receives dynamic indication to perform semantic error correction from the transmitter by at least one selected from the group of a bit field indication within Demodulation Reference Signal ("DM-RS") embedded in the originally transmitted transmission blocks within a PDSCH, a dedicated DCI bit field signaling over a Physical Downlink Control Channel ("PDCCH"), and a MAC-CE indication.

In one embodiment, in response to the determined transmissions error statistic being equal to or greater than a configured receiver capability of the maximum error rate threshold, retransmissions are necessary to be received by the transceiver transmitter to aid the transceiver in one of lowering the transmissions error statistic below the receiver capability of the maximum error rate threshold for transmission errors that the semantic error correction functionality can tolerate to achieve a fixed video reconstruction quality and eliminating the transmissions errors post FEC decoding.

In one embodiment, the transceiver provides to the transmitter a unit of HARQ feedback information, wherein the HARQ feedback information is comprised of an information tuple represented as a bit field wherein a first component is a HARQ acknowledgment ("ACK")/non-acknowledgement ("NACK") bit determined by completion of FEC decoding of a unit of a transmission block, and a second component represents a bit encoding of a confidence level describing the first component determination.

In one embodiment, the method independently controls the video approximate semantic communications mode by monitoring and determining a transmissions error statistic that triggers the semantic error correction enabling and/or disabling within its configured statistical running window and signaling appropriate units of HARQ feedback to the transmitter given the internal operation mode of the semantic error correction.

In one embodiment, the transceiver provides to the transmitter a unit of HARQ feedback information, wherein the HARQ feedback information is comprised of an information tuple represented as a bit field wherein a first component is a HARQ acknowledgment ("ACK")/non-acknowledgement ("NACK") bit determined by completion of FEC decoding of a unit of a transmission block, and a second component represents a bit encoding of a confidence level describing the first component determination.

In one embodiment, the first method includes quantizing the second component of a unit of HARQ feedback information to a discrete number of confidence levels such that a first HARQ feedback component as a NACK coupled with a second HARQ feedback component as a lowest confidence level represents a transmission wherein the remaining uncoded video artifacts of the bit-inexact transmission are semantically correctable and concealable by the enabled receiver semantic error correction processing.

In one embodiment, the first method includes a receiver device apparatus that is part of a Radio Access Network ("RAN") as one of a plurality of transmission-reception points wherein the receiver device apparatus and/or the enclosing RAN supports the video approximate semantic communications mode for semantic error correction.

In one embodiment, the first method includes signaling an explicit unit of HARQ-NACK feedback formed of a tuple of two components as a bit field, a first component corresponding to an associated NACK indication and a second component corresponding to an indication of the active status of the video approximate semantic communications mode whereby the unit of HARQ-NACK feedback signals to a transmitter the extension of a retransmission timer of configured grants ("CGs") to allow for the semantic error correction processing delay of the receiver by one of a fixed delay duration $\delta_{SEC}$ and a dynamic delay duration $\delta_{SEC}^{gNB}$ determined based on the receiver knowledge of processing semantic error correction delay and the time span to the next available configured grant occasion, whereby the determined $\delta_{SEC}^{gNB}$ extends the HARQ-NACK feedback tuple bit field as a third component.

A second apparatus is disclosed for radio access network configuration for video approximate semantic communications. The second apparatus may include a remote unit 105 such as a UE or a user equipment apparatus 900 or a network entity such as a base node, a gNB, and/or the network equipment apparatus 1000. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that receives an indication of video approximate semantic communications mode of a receiver and a configuration thereof and transmits a plurality of video coded data transmissions. In one embodiment, the second apparatus includes a processor that uses the configuration of video approximate semantic communications mode of the receiver to process HARQ feedback monitoring and to signal for enablement/disablement of semantic error correction at the receiver.

A second method is disclosed for radio access network configuration for video approximate semantic communications. The second method may be performed by a remote unit 105 such as a UE or a user equipment apparatus 900 or by a network entity such as a base node, a gNB, and/or the network equipment apparatus 1000. In some embodiments, the second method may be performed by a processor executing program code, for example, a microcontroller, a microprocessor, a CPU, a GPU, an auxiliary processing unit, a FPGA, or the like.

In one embodiment, the second method includes receiving an indication of video approximate semantic communications mode of a receiver and a configuration thereof and transmitting a plurality of video coded data transmissions. In one embodiment, the second method includes using the configuration of video approximate semantic communications mode of the receiver to process HARQ feedback monitoring and to signal for enablement/disablement of semantic error correction at the receiver.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. An apparatus comprising:
a memory; and
at least one processor coupled with the memory, the at least one processor configured to cause the apparatus to:
receive a bitstream comprising video coded data;
perform forward error correction ("FEC") decoding on the video coded data to correct at least one bitwise transmission error of the video coded data;
perform video decoding and semantic error correction on the FEC-decoded video coded data according to a fixed knowledge base of a video codec specification to correct and conceal at least one video artifact in the FEC-decoded video coded data due to a bit-inexact reception of the video coded data; and
reconstruct, based on the semantic error correction, a video uncoded representation of concealed approximate semantic content relative to the video coded data,
wherein the video decoding or the semantic error correction is performed based on the video codec specification, a statistical joint spatio-temporal video frame information, or a usage of the joint spatio-temporal video frame information as a first statistical prior semantic model with a second statistical model for the semantic error correction, and
wherein the video decoding or the semantic error correction is performed based on a joint optimization of the video decoding and the semantic error correction as a unique statistical neural model with the fixed knowledge base of the video codec specification.

2. The apparatus of claim 1, wherein the at least one processor is configured to cause the apparatus to signal a set of capabilities comprising at least one selected from the group of:
a first flag that describes an enablement state of the semantic error correction based on a bit value of the first flag;
an error rate threshold for an amount of transmission errors;
a statistical window configuration associated with monitoring a transmission error rate statistic and comparing error rate threshold to the monitored transmission error rate statistic;
a processing delay threshold associated with video decoding processing delay, a video semantic error correction processing delay, or both;
an average energy consumption indicator comprising a first estimate of average energy consumption with semantic error correction enabled and a second estimate of average energy consumption with semantic error correction disabled;
a power supply indicator that indicates a power source type;
an indication determining a maximum video frame mobility and video frame change rate that the semantic error correction can process to achieve a fixed video reconstruction quality; and
a second flag that indicates a capability to perform semantic error correction monitoring and whether the semantic error correction is enabled or disabled.

3. The apparatus of claim 2, wherein the set of capabilities is indicated by at least one selected from the group of:
semi-static Radio Resource Control ("RRC") message signaling;
dynamic Uplink Control Information ("UCI") bit field signaling;
dynamic UCI scheduling request signaling; and
user equipment ("UE")/device capability reporting signaling.

4. The apparatus of claim 3, wherein the at least one processor is configured to cause the apparatus to report the maximum error rate threshold for transmission errors tolerated by the semantic error correction and the statistical window configuration for monitoring, wherein the maximum error rate threshold is expressed by at least one selected from the group of:
a transmission block error rate ("BLER");
a log-likelihood ratio ("LLR") average statistic of transmission blocks; and
a video coded Network Abstraction Layer ("NAL") unit error rate ("NALuER") average statistic.

5. The apparatus of claim 4, wherein the at least one processor is configured to cause the apparatus to one of dynamically enable and disable capabilities based on the first flag, wherein the first flag is modified by at least one of:
an indication of at least one selected from the group of:
downlink control information ("DCI") bit field message signaling;
a DCI signaling for a data communication over a Physical Downlink Shared Channel ("PDSCH"); and
Medium Access Control-Control Element ("MAC-CE") bit field message signaling; and
an indication of at least one selected from the group of:
a UCI bit field message signaling;

a UCI signaling for a data communication over a Physical Uplink Shared Channel ("PUSCH"); and MAC-CE bit field message signaling.

6. The apparatus of claim 5, wherein the one of the dynamic enabling and disabling of the capabilities spans a duration of a countdown timer over which the semantic error correction is enabled or disabled.

7. The apparatus of claim 5, wherein the one of dynamic enabling and disabling of the semantic error correction capability is signaled based on at least one of:
   a battery energy threshold, wherein:
      the semantic error correction capability is at least partially disabled in response to a battery energy level dropping below the battery energy threshold; and
      the semantic error correction capability is enabled in response to the battery energy level satisfying the battery energy threshold; and
   a power supply status change, wherein:
      a disablement indication is signaled in response to a battery energy flow powering a receiver; and
      an enablement indication is signaled in response to an external energy source flow powering the receiver.

8. The apparatus of claim 5, wherein the at least one processor is configured to cause the apparatus to receive assistance based on at least one selected from the group of:
   a delay-aware predictive scheduling of one or more on-demand video keyframes;
   a multi-layered video coded traffic-aware opportunistic dropping of at least one video coded layer information; and
   monitoring and determining a transmission error statistic by enabling or disabling the semantic error correction within a configured statistical running window.

9. The apparatus of claim 8, wherein, in response to the transmission error statistic being less than a configured capability of a maximum error rate threshold, the at least one processor is configured to cause the apparatus to receive a dynamic indication to perform semantic error correction based on at least one selected from the group of:
   a bit field indication within Demodulation Reference Signal ("DM-RS");
   a dedicated DCI bit field signaling; and
   a MAC-CE indication.

10. The apparatus of claim 8, wherein, in response to the determined transmission error statistic being equal to or greater than a configured receiver capability of a maximum error rate threshold, the at least one processor is configured to cause the apparatus to receive retransmissions by one of:
   lowering the transmissions error statistic below a maximum error rate threshold; and
   eliminating the transmission errors post video decoding.

11. The apparatus of claim 1, wherein the at least one processor is configured to cause the apparatus to provide a unit of hybrid automatic repeat request ("HARQ") feedback information, wherein the HARQ feedback information comprises an information tuple comprising a first component that represents a HARQ acknowledgment ("ACK")/non-acknowledgement ("NACK") bit and a second component that represents a bit encoding of a confidence level associated with the first component.

12. The apparatus of claim 1, wherein the at least one processor is configured to cause the apparatus to determine a transmission error statistic that triggers enabling or disabling the semantic error correction within a configured statistical window and signaling units of HARQ feedback.

13. The apparatus of claim 12, wherein the at least one processor is configured to cause the apparatus to provide a unit of HARQ feedback information, wherein the HARQ feedback information comprises an information tuple comprising a first component that represents a HARQ acknowledgment ("ACK")/non-acknowledgement ("NACK") bit and a second component that represents a bit encoding of a confidence level associated with the first component.

14. The apparatus of claim 13, wherein the at least one processor is configured to cause the apparatus to quantize the second component to a discrete number of confidence levels wherein remaining uncoded video artifacts of a bit-inexact transmission are semantically correctable and concealable by the enabled semantic error correction.

15. The apparatus of claim 1, wherein the apparatus is part of a Radio Access Network ("RAN") as one of a plurality of transmission-reception points and wherein the apparatus or the RAN supports semantic error correction.

16. The apparatus of claim 15, wherein the at least one processor is configured to cause the apparatus to signal a unit of hybrid automatic repeat request non-acknowledgement ("HARQ-NACK") feedback comprising a tuple of two components, a first component corresponding to an associated NACK indication and a second component corresponding to an indication of an active status whereby the unit of HARQ-NACK feedback indicates an extension of a retransmission timer of configured grants ("CGs") to allow for a semantic error correction processing delay by one of:
   a fixed delay duration $\delta_{SEC}$; and
   a dynamic delay duration $\delta_{SEC}^{gNB}$ determined based on knowledge of processing semantic error correction delay and a time span to a next available CG occasion, whereby the determined delay duration of $\delta_{SEC}^{gNB}$ extends a bit field for the HARQ-NACK feedback comprising the tuple bit field as a third component.

17. A method comprising:
receiving a bitstream comprising video coded data;
performing forward error correction ("FEC") decoding on the video coded data to correct at least one bitwise transmission error of the video coded data;
performing video decoding and semantic error correction on the FEC-decoded video coded data according to a fixed knowledge base of a video codec specification to correct and conceal at least one video artifact in the FEC-decoded video coded data due to a bit-inexact reception of the video coded data; and
reconstructing, based on the semantic error correction, a video uncoded representation of concealed approximate semantic content relative to the video coded data,
wherein the video decoding or the semantic error correction is performed based on the video codec specification, a statistical joint spatio-temporal video frame information, or a usage of the joint spatio-temporal video frame information as a first statistical prior semantic model with a second statistical model for the semantic error correction, and
wherein the video decoding or the semantic error correction is performed based on a joint optimization of the video decoding and the semantic error correction as a unique statistical neural model with the fixed knowledge base of the video codec specification.

18. A processor for wireless communication, comprising:
at least one controller coupled with at least one memory and configured to cause the processor to:
receive a bitstream comprising video coded data;
perform video decoding and semantic error correction on the FEC-decoded video coded data according to a fixed knowledge base of a video codec specification to correct and conceal at least one video artifact in the FEC-decoded video coded data due to a bit-inexact reception of the video coded data; and reconstruct, based on the semantic error correction, a video uncoded representation of concealed approximate semantic content relative to the video coded data, wherein the video decoding or the semantic error correction is performed based on the video codec specification, a statistical joint spatio-temporal video frame information, or a usage of the joint spatio-temporal video frame information as a first statistical prior semantic model with a second statistical model for the semantic error correction, and wherein the video decoding or the semantic error correction is performed based on a joint optimization of the video decoding and the semantic error correction as a unique statistical neural model with the fixed knowledge base of the video codec specification.

* * * * *